United States Patent
Fowler et al.

(10) Patent No.: US 10,586,109 B1
(45) Date of Patent: Mar. 10, 2020

(54) INDOOR GUNSHOT DETECTION WITH VIDEO ANALYTICS

(71) Applicant: Shooter Detection Systems, LLC, Newburyport, MA (US)

(72) Inventors: Ronald A Fowler, Westford, MA (US); Richard Thomas Onofrio, Arlington, MA (US)

(73) Assignee: Shooter Detection Systems, LLC, Newburyport, MA (US)

( * ) Notice: Subject to any disclaimer, the term of this patent is extended or adjusted under 35 U.S.C. 154(b) by 187 days.

(21) Appl. No.: 15/498,283

(22) Filed: Apr. 26, 2017

Related U.S. Application Data

(60) Provisional application No. 62/327,552, filed on Apr. 26, 2016, provisional application No. 62/345,465, (Continued)

(51) Int. Cl.
*G01J 5/10* (2006.01)
*G10L 25/48* (2013.01)
(Continued)

(52) U.S. Cl.
CPC ............ *G06K 9/00711* (2013.01); *G01J 5/10* (2013.01); *G10L 25/48* (2013.01); *H04R 3/00* (2013.01);
(Continued)

(58) Field of Classification Search
CPC ............................... G06K 9/00711; G01J 5/10
See application file for complete search history.

(56) References Cited

U.S. PATENT DOCUMENTS

| 5,930,202 A | 7/1999 | Duckworth et al. |
| 6,178,141 B1 | 1/2001 | Duckworth et al. |

(Continued)

FOREIGN PATENT DOCUMENTS

| WO | WO0073811 A1 | 12/2000 |
| WO | WO2009046367 A1 | 4/2009 |

(Continued)

OTHER PUBLICATIONS

González-Castano, Francisco Javier, et al. "Acoustic sensor planning for gunshot location in national parks: A pareto front approach." Sensors 9.12 (2009): 9493-9512.

*Primary Examiner* — Mainul Hasan
(74) *Attorney, Agent, or Firm* — Adams Intellex, PLC

(57) ABSTRACT

Indoor gunshot detection is performed using video analytics. Infrared and acoustic information are collected within an indoor environment using a gunshot sensor. A gunshot is detected, in the indoor environment, based on the infrared and the acoustic information. Video collection is engaged based on the detecting of the gunshot. The video collection is from a video stream. In embodiments, the video stream is a buffered stream. Video analytics are performed for tracking a suspected shooter of the gunshot using the video that is collected. The suspected shooter is identified based on the video analytics. In embodiments, an audio microphone is activated based on the detecting of the gunshot. The suspected shooter is tracked based on the audio microphone. A person of interest is tagged and tracked by an operator of the gunshot detection system. Direction of the gunshot can be determined relative to the gunshot sensor unit.

25 Claims, 19 Drawing Sheets

Related U.S. Application Data filed on Jun. 3, 2016, provisional application No. 62/379,023, filed on Aug. 24, 2016, provisional application No. 62/429,754, filed on Dec. 3, 2016.

(51) Int. Cl.
  *H04R 3/00* (2006.01)
  *H04R 29/00* (2006.01)
  *G06K 9/00* (2006.01)

(52) U.S. Cl.
  CPC ... *H04R 29/00* (2013.01); *G06K 2009/00738* (2013.01)

(56) References Cited

U.S. PATENT DOCUMENTS

| | | |
|---|---|---|
| 6,847,587 B2 | 1/2005 | Patterson et al. |
| 7,203,132 B2 | 4/2007 | Berger |
| 7,266,045 B2 | 9/2007 | Baxter et al. |
| 7,411,865 B2 | 8/2008 | Calhoun |
| 7,474,589 B2 | 1/2009 | Showen et al. |
| 7,532,542 B2 | 5/2009 | Baxter et al. |
| 7,586,812 B2 | 9/2009 | Baxter et al. |
| 7,599,252 B2 | 10/2009 | Showen et al. |
| 7,602,329 B2 | 10/2009 | Manderville et al. |
| 7,688,679 B2 | 3/2010 | Baxter et al. |
| 7,710,278 B2 | 5/2010 | Holmes et al. |
| 7,719,428 B2 | 5/2010 | Fisher et al. |
| 7,750,814 B2 | 7/2010 | Fisher et al. |
| 7,751,282 B2 | 7/2010 | Holmes et al. |
| 7,755,495 B2 | 7/2010 | Baxter et al. |
| 7,796,470 B1 | 9/2010 | Lauder et al. |
| 7,855,935 B1 | 12/2010 | Lauder et al. |
| 7,961,550 B2 | 6/2011 | Calhoun |
| 8,036,065 B2 | 10/2011 | Baxter et al. |
| 8,063,773 B2 | 11/2011 | Fisher et al. |
| 8,134,889 B1 | 3/2012 | Showen et al. |
| 8,325,562 B2 | 12/2012 | Showen |
| 8,325,563 B2 | 12/2012 | Calhoun et al. |
| 8,351,297 B2 | 1/2013 | Lauder et al. |
| 8,369,184 B2 | 2/2013 | Calhoun |
| 8,478,319 B2 | 7/2013 | Azimi-Sadjadi et al. |
| 8,995,227 B1 | 3/2015 | Johnson |
| 9,240,114 B2 | 1/2016 | Showen et al. |
| 2003/0234725 A1* | 12/2003 | Lemelson .............. G08B 7/066 340/521 |
| 2004/0100868 A1 | 5/2004 | Patterson, Jr. et al. |
| 2008/0219100 A1 | 9/2008 | Fisher et al. |
| 2010/0058947 A1 | 3/2010 | Davis et al. |
| 2010/0278013 A1 | 11/2010 | Holmes et al. |
| 2012/0182834 A1* | 7/2012 | Mullen .................. F41G 3/147 367/118 |
| 2012/0300587 A1 | 11/2012 | Azimi-Sadjadi et al. |
| 2014/0361886 A1 | 12/2014 | Cowdry |
| 2015/0070166 A1 | 3/2015 | Boyden et al. |
| 2015/0071038 A1 | 3/2015 | Boyden et al. |
| 2015/0177363 A1 | 6/2015 | Hermann et al. |
| 2015/0268170 A1 | 9/2015 | Scott et al. |
| 2015/0347902 A1 | 12/2015 | Butler, Jr. et al. |
| 2016/0086472 A1 | 3/2016 | Herrera et al. |
| 2016/0133107 A1 | 5/2016 | Showen et al. |
| 2016/0225242 A1 | 8/2016 | Kane et al. |
| 2016/0232774 A1* | 8/2016 | Noland .............. G08B 13/1672 |
| 2016/0260307 A1 | 9/2016 | Skorpik et al. |
| 2017/0123038 A1 | 5/2017 | Griggs et al. |
| 2017/0169686 A1 | 6/2017 | Skorpik et al. |

FOREIGN PATENT DOCUMENTS

| | | |
|---|---|---|
| WO | WO2009048500 A2 | 4/2009 |
| WO | WO2009085361 A2 | 7/2009 |
| WO | WO2010039130 A1 | 4/2010 |
| WO | WO2010085822 A2 | 7/2010 |
| WO | WO2012103153 A2 | 8/2012 |
| WO | WO2014070174 A1 | 5/2014 |
| WO | WO2014165459 A2 | 10/2014 |

* cited by examiner

INDOOR GUNSHOT DETECTION WITH VIDEO ANALYTICS

RELATED APPLICATIONS

This application claims the benefit of U.S. provisional patent applications "Indoor Gunshot Detection with Video Analytics" Ser. No. 62/327,552, filed Apr. 26, 2016, "Indoor Gunshot Detection Analysis with Ongoing Fire Alarm" Ser. No. 62/345,465, filed Jun. 3, 2016, "Gunshot Detection within an Indoor Environment" Ser. No. 62/379,023, filed Aug. 24, 2016, and "Testing of Gunshot Sensors" Ser. No. 62/429,754, filed Dec. 3, 2016. The foregoing applications are each hereby incorporated by reference in their entirety.

FIELD OF ART

This application relates generally to gunshot detection and more particularly to indoor gunshot detection with video analytics.

BACKGROUND

The sound of gunshots in the wrong context is a very scary sound. In some contexts, gunshot sounds are not at all out of place, such as in the woods during hunting season or at a firing range. However, in many contexts, both indoors and outdoors, the sound of a gunshot or gunshots is extremely alarming. In many public settings, such as a crowded outdoor marketplace, for example, the sound of gunshots will cause confusion, panic, mob response, and other bad outcomes. However, the sound of gunshots in an indoor environment will often lead to even worse consequences, due to the enclosure of the indoor setting and its associated constrained egress. Getting a quick response from knowledgeable law enforcement officers is critical in minimizing chaos in an indoor gunshot scenario.

Gunshot detection by electronic devices, rather than by humans, is performed for a variety of purposes and applications that include the military, law enforcement, security, and public safety. Gunshot detection is a complex problem because of the variety of weapons and explosive devices that can produce the gunshot event. Identifying the source of the gunshot is critical to identifying and tracking a suspected shooter. The identification of the source of the gunshot is complicated by many factors including the environment in which the gunshot event occurs. Gunshot detection and shooter identification are critical elements in many military, law enforcement, security, and public safety scenarios.

Some early work in detecting gunshots in an outdoor setting involved several microphones spread out over a large distance. A gunshot is often so loud it can be heard many thousands of feet, even miles, away in an outdoor setting. The occurrence of a gunshot would then register on the microphones, but at slightly different times. Because the speed of sound in dry air at sea level at 68° Fahrenheit is about 1125 feet/second, a gunshot somewhere between two microphones that are 2500 feet apart would be detected at the microphones one or even two seconds apart, which is an easily detectable difference. Furthermore, the relative times of detection are an indication of the proximity of the gunshot to one microphone versus another microphone. Unfortunately, this scheme does not distinguish between gunshots and other similar sounds, such as car backfires, construction noises, fireworks, etc.

The problem of gunshot detection indoors is many times more complicated than gunshot detection outdoors. For the indoor setting, many complicating factors intrude upon accurate gunshot detection. For example, in an indoor setting, the probability of extensive sound reverberations and echoes from the initial gunshot is very high. In addition, rooms within the indoor setting often have convoluted acoustic pathways. These acoustic pathways are often blocked by closed doors which cause many decibels of sound attenuation. Furthermore, indoor settings are often spread over multiple floors and replete with crowds of people, which makes dealing with indoor gunshots extremely challenging for law enforcement officers or other public safety personnel.

SUMMARY

Gun violence continues to adversely affect society in indoor venues such as schools, places of worship, sporting events, nightclubs, and airports. External environmental factors such as noise and lights from fire alarms, or loud music and flashing lights in nightclubs, can cause challenges for indoor gunshot detection. One or more position-independent gunshot sensors is deployed. Infrared and acoustic information is collected within an indoor environment for indoor gunshot detection with video analytics. A gunshot is detected, in the indoor environment, based on the infrared and the acoustic information. Video collection from a video stream is engaged, based on the detection of the gunshot. Video analytics are performed for tracking of a suspected shooter of the gunshot, using the video that is collected. The video analytics use image classifiers, where the image classifiers are used to identify a gun type. The suspected shooter is identified based on the video analytics. An audio microphone is activated based on the detecting of the gunshot, and the tracking of the suspected shooter is further based on the audio microphone that was activated. The audio microphone is activated for limited time periods of varying length. An operator of the gunshot detection system tags a person of interest and uses the video analytics for tracking the person of interest.

Disclosed is a processor-implemented method for gunshot analysis comprising: collecting infrared information within an indoor environment using a gunshot sensor; collecting acoustic information within the indoor environment using the gunshot sensor; detecting a gunshot, in the indoor environment, based on the infrared information and the acoustic information; engaging video collection from a video stream based on the detecting of the gunshot; and performing video analytics for tracking a suspected shooter of the gunshot using the video that is collected. In embodiments, an audio microphone is activated based on the detecting of the gunshot. In embodiments, the tracking of the suspected shooter is further based on the audio microphone that was activated. In embodiments, video analytics utilize image classifiers to identify a gun. In embodiments, an additional gunshot, in the indoor environment, is detected, based on the infrared information and the acoustic information. In embodiments, the additional gunshot is used to identify multiple shooters.

In embodiments, a system for gunshot detection comprising: a plurality of gunshot sensor units, within an indoor environment, wherein each of the plurality of gunshot sensor units comprise: two infrared sensors; two acoustic sensors; a microphone; and a processor; a plurality of video cameras; and an analyzer, coupled to the plurality of gunshot sensor units and the plurality of video cameras wherein the analyzer: detects a gunshot, in the indoor environment, based on infrared information and acoustic information collected from the plurality of gunshot sensor units; and performs video analytics, based on video collected from the plurality of video cameras, wherein the video analytics tracks a suspected shooter of the gunshot using the video that is collected. In embodiments, a computer program product embodied in a non-transitory computer readable medium for gunshot detection, the computer program product comprising code which causes one or more processors to perform operations of: collecting infrared information within an indoor environment using a gunshot sensor; collecting acoustic information within the indoor environment using the gunshot sensor; detecting a gunshot, in the indoor environment, based on the infrared information and the acoustic information; engaging video collection from a video stream, based on the detecting of the gunshot; and performing video analytics for tracking a suspected shooter of the gunshot using the video that is collected.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
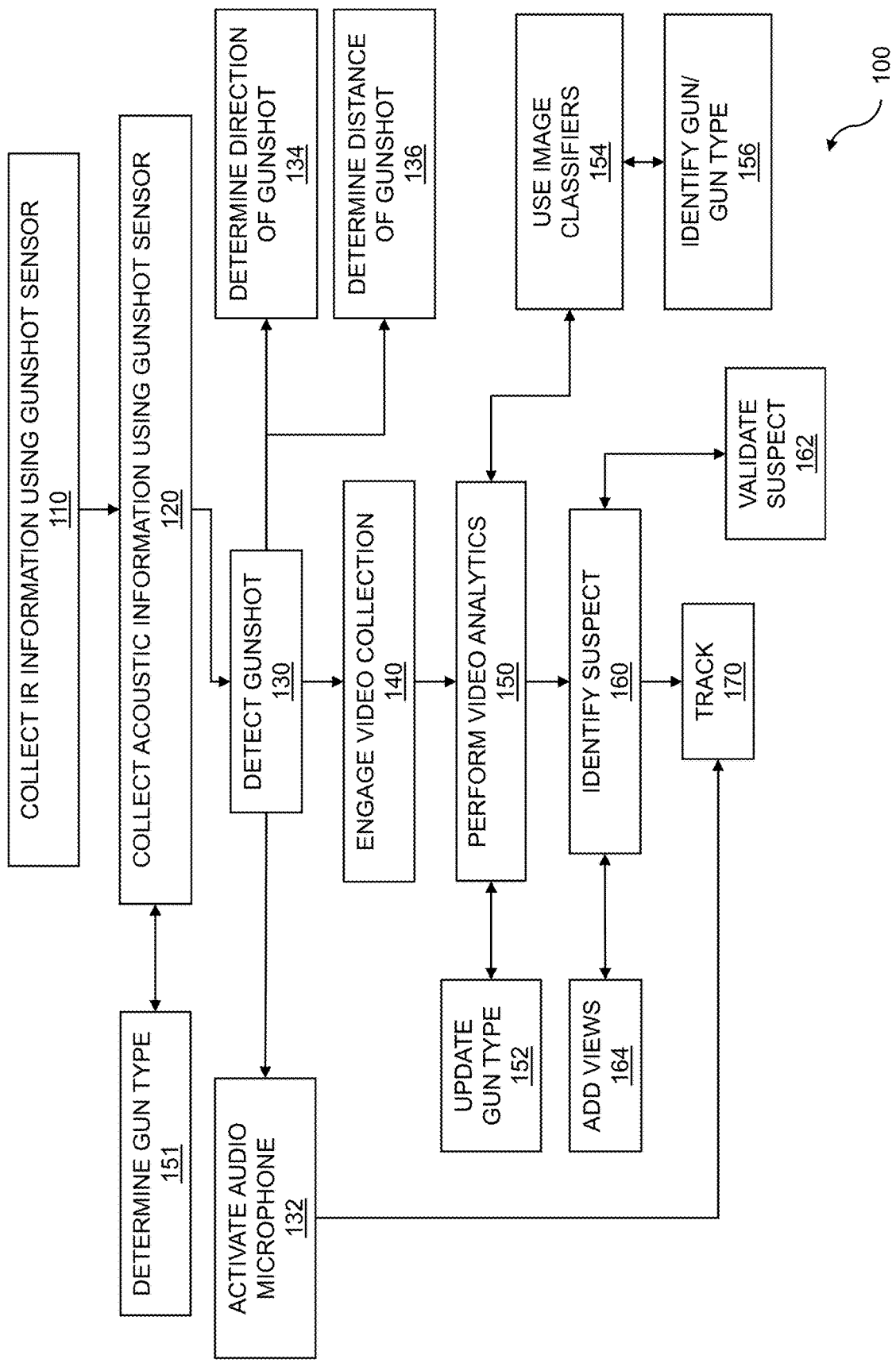
FIG. 1 is a flow diagram for gunshot analysis.

Gun violence has become a widely publicized issue in recent years. According to recent statistics, one in three people in the United States knows someone who has been shot. On average, 31 Americans are murdered with guns every day, and 151 are treated for a gun assault in emergency rooms every day. In 2015 alone, more than 12,000 people were killed in the United States by a gun, and many more were injured. Gun violence has unfortunately occurred in a variety of public places, such as schools, places of worship, sporting events, nightclubs, and airports. While the use of metal detectors and other security measures can be employed in an attempt to prevent firearms in such venues, these incidents of gun violence in public continue to be a major issue.

Due to the aforementioned situations, the ability to quickly detect gunshots has become critical for the safe operation of a variety of public and private organizations such as military defense, local law enforcement, public and private security, and public safety. Gunshot detection permits security personnel in a variety of organizations to quickly deploy resources to protect lives and property by reacting appropriately to the given event. To be especially valuable, gunshot analysis needs to occur in as close to real-time as possible. Near real-time analysis is that which occurs immediately before and after a suspected gunshot, as well as during the suspected gunshot event. Reviewing a video monitoring recording hours or even days after the event may be helpful in some ways, but having real-time and near real-time analysis is vastly superior in minimizing the harm caused by the attacker. Real-time or near real-time analysis includes both audio and video data from the scene of the suspected gunshot. And in the sad event that multiple gunshots occur, additional gunshot analysis is needed to determine whether one or more perpetrators of the gunshots exist and, if there are more than one, whether they are in the same or different rooms. Discrimination between gunshot flashes and other sources of brief, intense light such as a fire alarm strobe light must also be carefully taken into account in the analysis.

Gunshot detection is a complex process, as the gunshot event is a function of multiple factors including the weapon and/or ammunition used, the environment in which the gunshot event occurs, the spectra of the gunshot event, and so on. When a weapon is fired, various physical events occur. In the case of a typical firearm such as a pistol or rifle, a combination of optical and acoustic events occur. There is a flash that typically occurs when the projectile (e.g. bullet) is expelled from the muzzle of the weapon. The flash can include infrared light spectra and visible light spectra. There is a muzzle blast that results from the expulsion of the projectile. The muzzle blast typically includes a high sound-pressure level wave event that manifests as a crack, boom, or other such sound. There can also be a shock wave that results from the projectile traveling through air. This latter event occurs particularly with projectiles traveling at supersonic speeds. A muzzle blast can reflect off of buildings and down alleys, off of rock faces, hillsides, and edges of forests, and across water, walls, desks, furniture, book cases, partitions, windows, mirrors, and other surfaces. Thus, although there are numerous challenges in gunshot detection, it remains an important tool for law enforcement and can serve to prevent additional loss of life during a mass shooting event.

Detection of gunshots is critical within an indoor environment. It is crucial to be able to identify true gunshots, with their corresponding muzzle flashes and loud acoustic signatures, while the elimination of any false alerts is likewise important. Once a gunshot is detected, it is then even more critical to analyze the gunshot situation. If the perpetrator of the gunshot can be identified quickly and in real-time, a huge benefit accrues to law enforcement and other officials, as it shortens the time they need to respond appropriately. Furthermore, tracking the identified suspected shooter in real-time or near real-time by tagging a figure in the video data can be infinitely valuable to law enforcement and other officials. A gunshot sensor can be placed in an indoor environment. The gunshot sensor can include multiple individual sensors, including, but not limited to, an acoustic sensor and an infrared sensor. The acoustic sensor can detect an acoustic pressure wave, which is often emitted by a firearm when it is fired. Additionally, a firearm typically emits energy within the infrared spectrum when fired. Thus, by detecting the infrared emission coincidental with a detected acoustic pressure wave, a presumption of a gunshot can be inferred. The acoustic sensor can be configured to detect the initial pressure wave emitted from a firearm. By design, the acoustic sensor can only initially detect very loud, sudden bursts of acoustic energy associated with a gunshot, such as shock waves and/or loud blasts. Other noises, such as loud music, slamming doors, and voices do not trigger the acoustic pressure sensor. Disclosed methods include discrimination between real gunshots and other, spurious noises. Once a real gunshot has been detected, video streams are engaged to quickly enable video analysis and identification of a suspected shooter within the video stream feed. Having a real-time analysis of the video stream is exponentially more valuable than law enforcement personnel crawling through video after the fact. In addition, sounds from the scene of the gunshot are near-simultaneously engaged for further real-time analysis.

Thus, disclosed sensors provide numerous advantages. One such advantage is a legal benefit in that the acoustic sensor does not record voices as a traditional microphone would. This maintains privacy in the indoor environment, as the acoustic sensor does not pick up conversations that might be transpiring in the environment. Another key advantage is that the acoustic sensor is configured to detect the primary acoustic wave from the firearm, but is unlikely to pick up reverberations and echoes from reflections and reverberations. Since these secondary acoustic waves that might be reflected from walls and other surfaces in the indoor environment are mostly ignored by the acoustic sensor, it facilitates a position-independent gunshot sensor. There is no need for special calibrations for a given indoor environment. This is particularly advantageous in large indoor environments such as schools, airports, gymnasiums, and sporting arenas. Thus, the analyzing can be accomplished without tuning the gunshot sensor for the indoor environment in which the gunshot sensor resides. In such environments, multiple gunshot sensors can be used. The installation of the gunshot detection system in these indoor environments is straightforward and time-efficient because there is no need to specifically select a particular position within the indoor environment, nor is there a need for any pre-use calibration. This enables the disclosed systems to be quickly and efficiently installed in indoor environments, providing the desired gunshot detection in important transportation venues, entertainment venues, hospitals, and other large, public, indoor environments.

In some configurations, multiple gunshot sensors are used, and they are connected to a gateway device that receives feedback from the gunshot sensors and can report the data upstream to a monitoring system, emergency warning system, or another suitable system. The gateway device can be a central analyzer, or processor, that takes input from multiple gunshot sensors and provides a composite analysis of the detected gunshots. In some configurations, the central analyzer function is partially distributed among the various gunshot sensors in addition to being centrally analyzed. In some configurations, the gunshot sensor can further include a video camera and a microphone. The microphone can be connected to a pickup circuit with its gain set such that the microphone only picks up very loud noises (e.g. 130 decibels or greater), such as a muzzle blast, and does not pick up ordinary conversation. In some embodiments, the video camera and microphone are only activated after a gunshot detector detects a possible gunshot. Thus, if a gunshot is detected in the indoor environment, the microphone and video camera can be activated to attempt to record audio and video of the scene and possibly record audio and video of the suspect(s) that fired the gunshot. In such embodiments, the gunshot sensor enters a surveillance mode once a gunshot has been detected, and the gain of the microphone circuit can be adjusted to pick up additional sounds. The recorded audio and video information can be of tactical importance to law enforcement so that they can better understand the extent of injuries and casualties, as well as to assess the number of shooters on the scene.

In some configurations, the video stream is naturally buffered such that at any moment in time, the past several seconds are available as near real-time video. This configuration allows video of the exact moment of the apparent gunshot to be captured to aid in the analysis because the buffered video stream contains video of just-past events. Likewise, some configurations can include passive buffering of the audio feed, where the buffering occurs before the attenuation such that the last several seconds of conversation before the gunshot event can be accessed and analyzed. Such buffering can be accomplished through a digital or analog "bucket-brigade" delay line, or other such suitable passive buffering device, and does not store any audio unless required by a gunshot event.

Another challenge of gunshot detection in an indoor environment is the various external environmental factors that can occur in temporal proximity to a gunshot. For example, a fire alarm can create both a very loud noise and a flashing strobe. In a nightclub, music can be very loud, and there might be a multitude of strobes and other flashing lights. Disclosed systems can accommodate such environmental factors and still provide effective gunshot detection with one or more position-independent gunshot sensors placed within an indoor environment, thus providing effective and efficient gunshot monitoring, and improving public safety.

A typical firearm discharge involves various phenomena. There is a muzzle flash, which emits visible and infrared light. A muzzle flash typically comprises multiple phases, which include a primary flash, an intermediate flash, and a secondary flash. The primary flash results as hot, highly compressed gases, which are the unburned propellants, exit the barrel along with the projectile. These gases expand rapidly without mixing with the atmosphere, and then rebound. This creates a high-temperature region that produces the intermediate flash. As oxygen mixes with the unburned propellants, ignition occurs, causing the secondary flash. A majority of the radiated energy corresponding to the muzzle flash occurs during the secondary flash, and most of the total radiated energy is part of the infrared (IR) spectrum. This is in contrast to other environmental factors within an indoor environment, such as fire alarm strobes. A fire alarm strobe is mostly in the visible spectrum, with a much lower IR component. Thus, detecting IR energy is an important aspect of distinguishing gunshots from other flashing light sources.

A shock wave can also occur, which is caused by the supersonic travel of the projectile/bullet. A supersonic bullet causes a distinctive shock wave pattern as it moves through the air. The shock wave expands as a cone behind the bullet, with the wave front propagating outward at the speed of sound. As the shock wave propagates, the nonlinear behavior of the air causes the pressure disturbance to form an "N" shape with a rapid onset, a ramp to the minimum pressure, and then an abrupt offset. Most events within an indoor environment do not cause a shock wave. For example, a door slamming, while perceived as loud to someone within its hearing, does not cause a shock wave such as that resulting from supersonic travel of a projectile. Thus, detection of a shock wave can be an important factor in gunshot detection. However, shock waves are largely dependent on the orientation of projectile motion. Hence, the direction of the gunshot in relation to the gunshot detector can affect the magnitude of the detected shock wave. Furthermore, there can be a muzzle blast, which is the sound caused by the discharge of the firearm. A typical firearm uses a confined explosive charge to push the bullet out of the gun barrel. The hot, rapidly expanding gases cause a muzzle blast to emerge from the barrel. The acoustic disturbance can have a duration in the range of 3 to 5 milliseconds and propagates through the air at the speed of sound.

Gunshot detection is a critical task and key priority of law enforcement, public safety officials, and the military. With local, state, and federal budgets stretched thin, efficient and cost effective identification of a gunshot event has become paramount. When a gunshot event is determined to have occurred, officials desire to quickly identify the source of the gunshot event and to glean as much additional information as possible about the event. The additional information includes number of shooters, weapons available to the shooters, direction of movement of shooters, etc. This additional information is essential to tactical deployment of equipment and personnel to neutralize the situation as quickly and as safely as possible.

In this technique, indoor gunshot detection is accomplished with video analytics. Infrared information is collected within an indoor environment. The infrared information can be collected using infrared sensors, infrared cameras, etc. Acoustic information is collected within the indoor environment. The acoustic information can be collected using acoustic sensors, microphones, and so on. A gunshot is detected, in the indoor environment, based on the infrared information and the acoustic information. The detection of the gunshot can be based on infrared information such us a muzzle flash, acoustic information such has a high sound pressure level event, etc. Video collection from a video stream is engaged, based on the detecting of the gunshot. The video collection can include receiving video information from a video camera, a still camera, or other digital image capture device. Video analytics are performed on the collected video. Video analytics are performed for tracking a suspected shooter of the gunshot using the video that is collected. The video analytics can be based on a variety of video processing algorithms, heuristics, codes, etc. The video analytics can utilize image classifiers, where the image classifiers can be used to identify a gun type. The video analytics can be used to identify the suspected shooter and for tracking the suspected shooter. Tracking can be accomplished with operator oversight, where operator oversight is based on the interactions of a human operator with the gunshot detection system. A person of interest can be tagged by the operator, and the video analytics can be used for tracking of the person of interest. The tracking can be based on clothing, body type, facial features, body features, weapons, or motion.

An audio microphone can be activated based on the detecting of the gunshot. The audio information that can be collected from the audio microphone can be used for the tracking of the suspected shooter. The audio microphone can be activated for various purposes and for time periods of varying lengths. The audio microphone can be activated for a first limited period of time. The first limited period of time can allow capture of audio information for purposes such as system testing and debugging, verification of suspected shooter tracking, etc. The audio microphone can stay active for a second limited period of time. The second limited period of time during which the audio microphone is active can be used for collecting audio information related to suspected shooter status, activity, motion, etc. Information collected from the audio microphone can be discarded after a third limited period of time. The discarding of audio information collected from the audio microphone can be discarded for purposes including security, confidentiality, privacy, etc.

FIG. 1 is a flow diagram for gunshot analysis. The flow 100 can comprise a processor-implemented method for gunshot analysis. Indoor gunshot detection can be based on infrared information and acoustic information, where both types of information can be collected within an indoor environment. Video collection from a video stream can be engaged based on the detecting of the gunshot 130. Video analytics 150 can be performed for tracking a suspected shooter using the collected video 140. An audio microphone can be activated based on the detecting of the gunshot. The tracking of the shooter 170 can be further based on the audio microphone that can be activated. The flow 100, or portions thereof, can be implemented using a semiconductor chip, a handheld device, a mobile device, a server, a cloud processor, and so on. The flow 100 describes indoor gunshot detection with video analytics. The flow 100 includes obtaining and/or collecting infrared (IR) information within an indoor environment 110. The indoor environment can include an interior of a building. The indoor environment can comprise a plurality of hallways and a plurality of rooms. The indoor environment can include a plurality of gunshot sensor units. The plurality of gunshot sensor units can be utilized to locate where the gunshot occurred within the indoor environment. The indoor environment can include a plurality of hallways and a plurality of rooms, meeting rooms, an auditorium, common areas, stairwells, and so on. The IR information can be collected from an IR sensor, an IR camera, or another IR capture device. The flow 100 includes obtaining and/or collecting acoustic information 120 within the indoor environment. The acoustic information can be collected from an acoustic sensor, an acoustic microphone, or another acoustic capture device. The acoustic sensor can be designed for indoor use, outdoor use, or both. The infrared information and the acoustic information can be collected from a gunshot sensor. One or more gunshot sensors can be mounted within the indoor environment.

The flow 100 includes detecting a gunshot 130, in the indoor environment, based on the infrared information and the acoustic information. Embodiments include analyzing the infrared information and the acoustic information to determine a gunshot occurrence wherein the gunshot occurrence is determined independent of the gunshot sensor location. The detecting of the gunshot can include weighting the IR and the acoustic information, giving priority to either the IR or the acoustic information, etc. The gunshot can be detected based on an IR event such as a muzzle flash, an explosion, a fire or another heat source, and so on. The initial acoustic information collected can be used to initially determine a gun type 151. For example, multiple, rapid-fire gunshots can indicate an automatic weapon is in use. The initial gun type can be later modified as video or other corroborating data is analyzed. The gunshot can be detected by an acoustic event such as a high sound pressure level (SPL) event. The flow 100 includes activating an audio microphone 132 based on the detecting of the gunshot. The audio microphone can capture audio data that can be analyzed for the gunshot detection. The audio microphone can be an audio sensor, a microphone, or another audio capture device. The audio microphone can comprise the acoustic sensor. The audio microphone can be activated for a first limited period of time. The limited period of time at which the audio microphone can be activated can be a random time, a coincident time, where the coincident time is associated with a gunshot detection event, periodic times (e.g. take an N second sample every M seconds), and so on. The audio microphone can stay active for a second limited period of time. Audio data can be collected from the audio microphone during the second limited time period. The second limited time period can be a specific time, a variable time, an operator selected time, and so on. Information collected from the audio microphone can be discarded after a third limited period of time. The discarding of the collected audio data from the audio microphone can occur for a variety of reasons including for security, privacy, confidentiality, etc. The first limited period of time can be 60 seconds or less. The second limited period of time can be 60 minutes or less. In the case of an extended gunshot event or other need, the second limited period of time can be manually overridden to provide a longer time. The third limited period of time can be 60 days or less. In the case of an official investigation, however, the third limited period of time can be extended as required by law.

In some embodiments, during a normal mode of operation, the microphone is connected to a pickup circuit with its gain set such that the microphone only picks up very loud noises (e.g. 130 decibels or greater), such as a muzzle blast, and does not react to ordinary conversation. In these embodiments, the gunshot sensor transitions from a normal mode and can enter a surveillance mode once a gunshot has been detected. In the surveillance mode, the gain of the microphone circuit can be adjusted to pick up additional sounds such as voices, so that information regarding the emergency situation caused by the gunshot can be recorded and/or relayed to law enforcement. In some embodiments, a short, less than ten second audio buffering is employed before the attenuation is performed. This buffering is not recorded, but just delayed in case a subsequent gunshot detection occurs, so that audio may be analyzed from just prior to the gunshot event.

In embodiments, a system for gunshot detection covers an indoor environment, where the indoor environment can include a plurality of gunshot sensor units. Each gunshot sensor can include two infrared sensors, two acoustic sensors, a microphone, and a processor. The two acoustic sensors can be attenuated so that a high SPL event that might occur does not saturate or deafen the acoustic sensors. The two acoustic sensors that are attenuated can preclude the detection of voices. The acoustic sensors can be "tuned" or designed to ignore voices using various techniques, including electronic filtering, mechanical filtering, SPL, and so on. The gunshot sensor can include a plurality of video cameras and an analyzer, coupled to the plurality of gunshot sensor units and the plurality of video cameras, where the analyzer can detect a gunshot in the indoor environment based on infrared information and acoustic information collected from the plurality of gunshot sensor units; and can perform video analytics, based on video collected from the plurality of video cameras, where the video analytics can track a suspected shooter using the video that is collected. The plurality of gunshot sensor units can be used to locate where the gunshot occurred, a distance from a gunshot sensor to the gunshot source, etc. The gunshot sensor can be coupled to one or more video cameras located within range of the gunshot sensor. The range can be limited to about half of the distance to a next gunshot sensor. A gunshot sensor unit can comprise the gunshot sensor and one or more video cameras in a single housing. The gunshot sensor can include two infrared sensors and two acoustic sensors in a single housing. The gunshot sensor unit can comprise a processor for distributed data analytics. The gunshot sensor unit can provide data used to determine distances of the gunshot from the gunshot sensor unit. The gunshot sensor unit can determine direction of the gunshot relative to the gunshot sensor unit.

The flow 100 includes determining direction of the gunshot 134 relative to a gunshot sensor unit. The determining the direction of the gunshot can be accomplished using the two IR sensors, where the two IR sensors can be pointed to cover different fields of view. Depending on the orientation of the gunshot sensor unit (such as over a door, on a ceiling, on a wall, etc.), the IR sensors can be pointed left and right, up and down, both down, both up, and so on. In embodiments, the two acoustic sensors are pointed in different directions. The acoustic sensors can be pointed in directions similar to or different from the IR sensors. The flow 100 includes using the infrared information and the acoustic information to determine distance of the gunshot 136 from a gunshot sensor unit. The distance of the gunshot from the gunshot sensor can be determined by a variety of techniques and times, such as using the time difference between the arrivals of the IR signal and the acoustic signal.

The flow 100 includes engaging video collection 140, based on the detecting of the gunshot. The engaging of the video collection can be based on the IR information and the acoustic information that was collected. The video collection can be performed by a video camera, a still camera, a video sensor, and so on. In embodiments, the gunshot sensor is coupled to a video camera. The video collection can be engaged from a buffered video stream. The video collection can be engaged within one second of a gunshot being detected. The video collection engaged from the buffered stream can correspond to a point in time before the gunshot occurs. The flow 100 includes performing video analytics 150 for tracking a suspected shooter using the video that is collected. The performing video analytics can include identifying people, objects, firearms, etc. The video analytics can utilize image classifiers 154. The image classifiers can be used to identify characteristics about a gunshot event, a suspect shooter, and so on. The image classifiers can be used to identify a gun or a gun type 156. For example, the image classifiers can be used to identify a gun type such as a revolver, a semi-automatic handgun, etc., and/or to estimate or determine ammunition capacity. The video analytics can be used to update a gun type 152. The video analytics can be performed on a buffered video stream at a rate faster than real-time to enable the video analytics to return to near real-time, which could be described as "catching up." Thus for example, a gunshot detected at a point in time A will engage video analytics starting earlier in time in the buffered video stream, say, A minus 4 seconds, such that the video analytics begin before the gunshot actually occurs. Subsequently, the analytics can proceed at a rate faster than real-time such that within a short period of time, say 10 seconds, the analytics are being performed at real-time or near real-time. After "catching up," the analytics can proceed at the normal, real-time, or near real-time, rate. Near real-time can be less than 1 second of delay from real-time.

The flow 100 includes identifying the suspected shooter 160 based on the video analytics. The video analytics can be used to identify a suspected shooter with techniques such as identifying a person within a room, in a hallway, in a stairwell, etc. The video analytics can be used to identify facial features, facial landmarks, and other distinguishing characteristics of a suspected shooter. The flow 100 includes tracking the shooter 170. As discussed above, video analytics can be used for tracking a suspected shooter. Other information, including IR, acoustic, and audio information can be used for tracking purposes. The tracking of the suspected shooter can be further based on the audio microphone 132 that was activated. The audio microphone can be used to collect speech data, motion data, etc., from the suspected shooter. The tracking can be accomplished with operator oversight. The operator can be a human operator who is interacting with the gunshot detection system. The operator with oversight of the gunshot detection system can control tracking, supervise tracking, monitor tracking, and so on. The tracking can be based on tagging a person of interest by the operator. The operator can tag a person of interest by selecting the person within the video stream or additional video streams, placing an electronic tag on the person, isolating the person from among other people, and so on. The tracking can be based on clothing, body type, facial features, body features, weapon possession, or motion. The video analytics and the image classifiers can be used to identify clothing type and color; body type such as tall, short, overweight, or thin; facial features such as distinguishing characteristics; weapon numbers and types; the direction of suspected shooter motion, etc. The tag can provisionally identify the suspect. The tag can be modified based on additional analytics. Views can be added 164 of the identified suspect. The views can include a front view, a side view, a back view, a partially occluded view where not all of the suspect can be seen, a top view, a bottom view, or other views. The flow 100 includes validating the suspect 162. The suspect can be validated through additional analytics, added views, operator intervention, audio signatures, and the like.

The tracking a suspected shooter of the gunshot can be based on identifying a presented gun that appears for the gunshot. The tracking the suspected shooter of the gunshot can continue even if the gun is no longer presented. The suspected shooter of the gunshot can be tagged with a tag in the video analytics based on the identifying a presented gun. The tag of the suspected shooter can be modified based on distinguishing the suspected shooter of the gunshot as a legitimate law enforcement officer. The tag of the suspected shooter can be modified by an operator. An operator can be a human operator who is engaging with the gunshot detection system. The operator can be a virtual operator based on artificial intelligence software running on one or more processors.

In embodiments, determining an initial gun type based on acoustic information and updating the initial gun type determination based on the video analytics. In embodiments, identifying a presented gun based on video analytics, identifying suspected shooter features based on further video analytics of a person presenting the presented gun, and validating the suspected shooter based on still further video analytics. In embodiments, adding identifiers to the video analytics based on one or more views of the suspected shooter, wherein the identifiers are used to tag the suspected shooter in the video analytics. In this way, the analytics system "learns" from the one or more views and creates new identifiers specific to the event at hand so that the suspect can be identified from later or additional video and audio streams. In embodiments, analyzing audio output of an audio microphone based on the detecting of the gunshot, wherein the audio output is passively buffered until the analyzing begins (that is, not recorded as a matter of design like most video streams), using audio classifiers to make an identification of the gun type, updating the identification based on the video analytics, wherein the video analytics includes using video classifiers to make a further identification of the gun type. In embodiments, analyzing audio output of an audio microphone based on the detecting of the gunshot, wherein the audio output is passively buffered until the analyzing begins (that is, not recorded as a matter of design like most video streams), using audio classifiers and video classifiers to identify a suspected shooter, and updating the audio and video classifiers based on subsequent analyzing. In embodiments, generating an audio gunshot signature, wherein the audio gunshot signature is used to distinguish one or more additional gunshots from the gunshot that was initially detected.

Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors. In embodiments, a processor-implemented method for gunshot analysis comprising: collecting infrared information within an indoor environment using a gunshot sensor; collecting acoustic information within the indoor environment using the gunshot sensor; detecting a gunshot, in the indoor environment, based on the infrared information and the acoustic information; engaging video collection from a video stream, based on the detecting of the gunshot; and performing video analytics for tracking a suspected shooter of the gunshot using the video that is collected.

Figure 2:
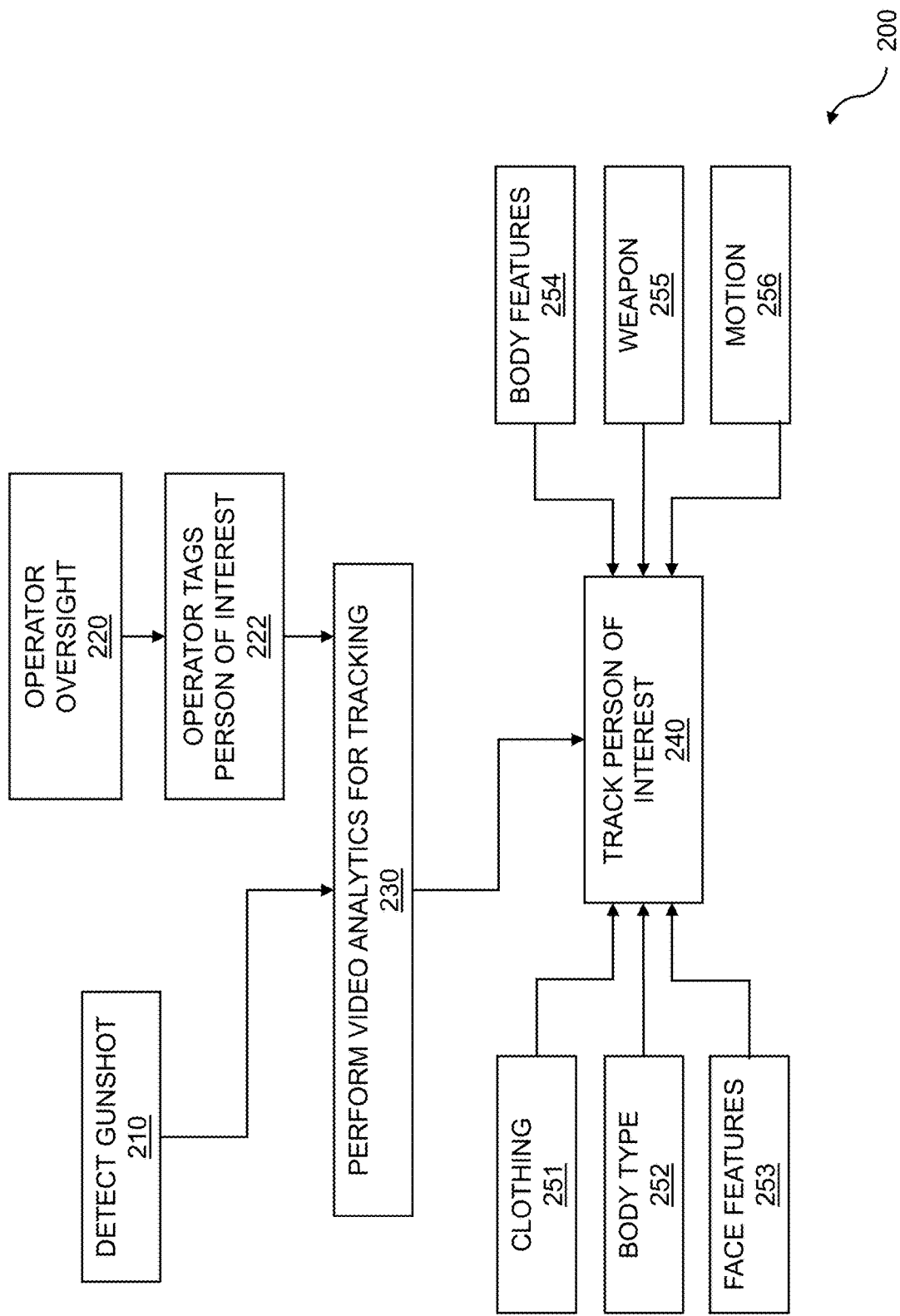
FIG. 2 is a flow diagram for analytics usage.

FIG. 2 is a flow diagram for analytics usage. Indoor gunshot detection can be based on infrared information and acoustic information, where both types of information can be collected within an indoor environment. Video collection can be engaged based on the detecting of the gunshot. Video analytics can be performed for tracking a suspected shooter of the gunshot using the collected video. An audio microphone can be activated based on the detection of the gunshot. The tracking of the shooter can be further based on the audio microphone that can be activated. The flow 200 includes detecting a gunshot 210, in an indoor environment, based on infrared information and acoustic information. As discussed above, the infrared information can be collected within an indoor environment, and the acoustic information can be collected within the indoor environment. The flow 200 includes operator oversight 220, where tracking can be accomplished by a tracking system, and the operator oversight can be oversight by a human operator of the gunshot detection system. The operator oversight can be used to assist gunshot detection, control gunshot detection, override gunshot detection, and so on. The flow 200 includes tagging a person of interest 222 with a tag by an operator of a gunshot detection system and using the video analytics (discussed above and further below) for tracking the person of interest. The tagging by the operator can be used to assist in the tracking of the person of interest, enhance tracking, control tracking, etc.

The flow 200 includes performing video analytics for tracking a suspected shooter 230 using the video that is collected. The video analytics can use image classifiers, where the image classifiers can be used to identify various characteristics in the video that can be collected. The classifiers can be used to identify a gun type. The gun type can include a handgun, a long gun, etc., and can further identify whether the gun is a revolver, a semiautomatic, or an automatic weapon. The classifiers can be used to estimate the round capacity of the gun type identified. The performing video analytics for tracking can also be used to identify a suspected shooter. The flow 200 includes tracking a person of interest 240. The tracking can be accomplished by the gunshot tracking system and by operator oversight. As discussed above, the operator can be a human operator of an indoor gunshot detection system. The operator of the gunshot detection system can tag a person of interest, and the video analytics can be used for the tracking of the person of interest 230. The tracking can be based on other factors as well such as the location of the gunshot, the location of the person of interest, the direction of movement of the person of interest, and so on. The tracking can be based on clothing 251, body type 252, facial features 253, body features 254, weapons 255, or motion 256.

Clothing can include clothing color, clothing style, clothing features, and so on. Body type can include body height, body mass, body posture, and so on. Facial features can include facial shape, facial complexion, facial expression, various hair color, length, and style, and so on. Masks or disguises can be identified covering the facial features. Body features can include body tattoos, body gait, limp, and stride, body presentation, body twitches and tics, and so on. Motion can include speed of movement of both arms and legs, range of movement, repetition of movement, and so on. Various steps in the flow 200 may be changed in order, repeated, omitted, or the like without departing from the disclosed concepts. Various embodiments of the flow 200 can be included in a computer program product embodied in a non-transitory computer readable medium that includes code executable by one or more processors.

Figure 3:
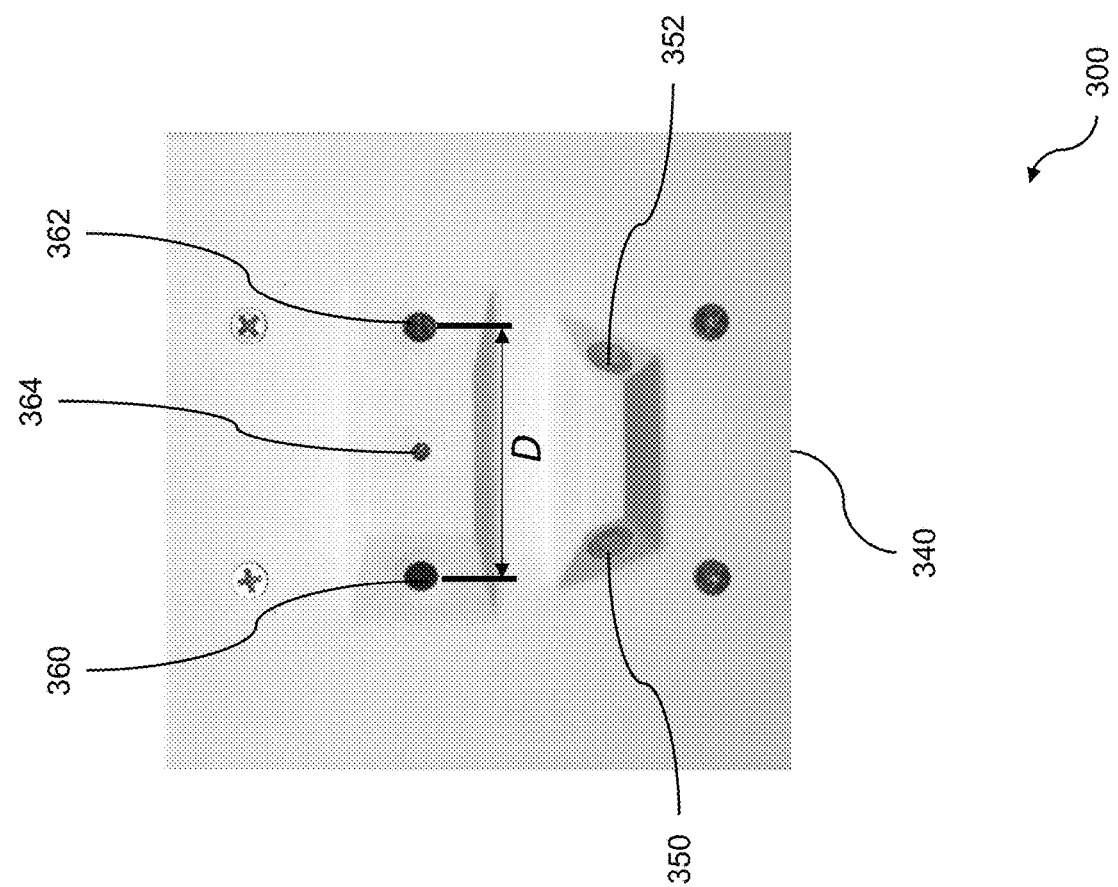
FIG. 3 is an example illustrating sensors.
Figure 3:
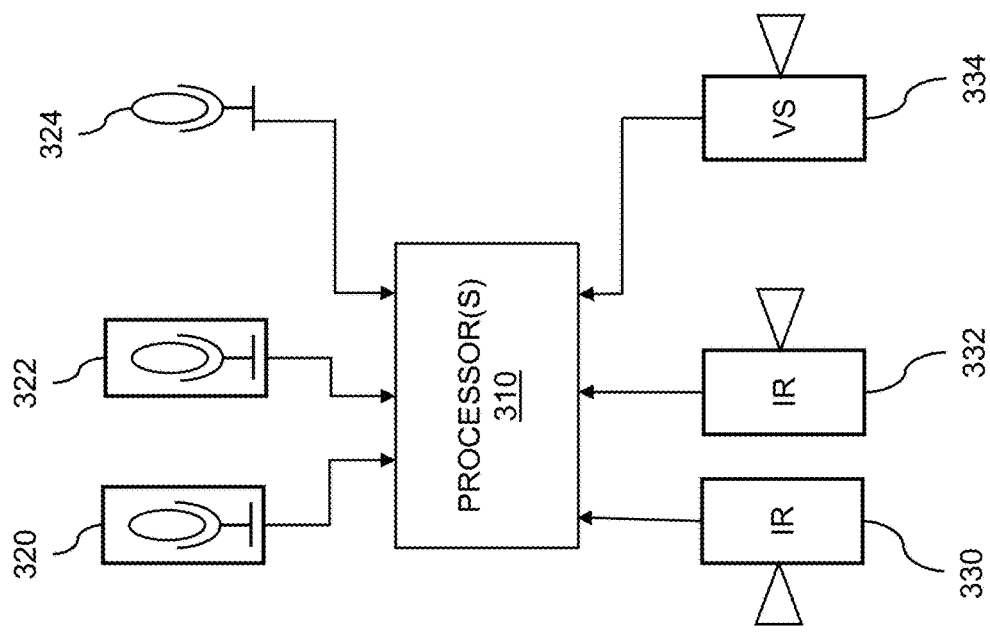

FIG. 3 is an example illustrating sensors. Indoor gunshot detection can be based on infrared information and acoustic information, where both types of information can be collected within an indoor environment. Video collection can be engaged based on the detecting of the gunshot. Video analytics can be performed for tracking a suspected shooter of the gunshot using the collected video. An audio microphone can be activated based on the detection of the gunshot. The tracking of the shooter can be further based on the audio microphone that was activated. An example of a sensor unit 300 is shown for indoor gunshot detection. A sensor can include one or more processors 310, two infrared sensors 330 and 332, two acoustic sensors 320 and 322, and a microphone 324. The microphone 324 can be a surveillance microphone that is disabled by default and is only enabled in response to detection of a possible gunshot. The infrared sensors 330 and 332 can be used to collect infrared information, where the infrared information can include a muzzle flash, a flash from an explosion, heat from a flame, etc. The acoustic sensors 320 and 322 can be used to detect sound pressure levels (SPL) events such as shock waves, where the sound pressure levels of the events can be compared to the SPLs of muzzle blasts from gunfire, explosions, and other events. The microphone 324 can be activated based on detecting a gunshot. The microphone 324 can be used for tracking a suspected shooter. The microphone can be activated for a first limited period of time. The first limited period of time can include times when the microphone is active, and any audio information collected during the first limited period of time can be used for a variety of purposes, such as diagnostic purposes. The microphone can stay active for a second limited period of time. The second period of time can be used for information gathering, including tracking information. The information collected from the microphone can be discarded after a third limited period of time. The discarding of information collected by the microphone can serve various purposes including security, confidentiality, and so on.

In some embodiments, the microphone 324 is configured to be operative during normal conditions at a very low gain, such that it only detects sounds in excess of 130 decibels. In this way, the microphone 324 can be used to detect distinct sounds from gunshots without picking up other sounds, such as conversations. Once a gunshot is detected, the gain is adjusted so that the microphone 324 can pick up additional information to help law enforcement assess the situation. Thus, once a gunshot is detected, the microphone gain can be adjusted to pick up sounds at a lower sound level (e.g. 50 decibels) so that conversations and other sounds can be detected during the emergency situation.

A gunshot sensor can further include a video system 334. The video system 334 can include a video camera and additional sensors to capture video data and can be configured to activate upon detection of a possible gunshot. Embodiments perform video analytics based on video collected from the video system 334. The video analytics can track a suspected shooter of the gunshot using the video that was collected.

An example gunshot sensor unit 340 is shown. The sensor unit 340 can include infrared (IR) sensors 350 and 352, acoustic sensors 360 and 362, and a microphone 364. The acoustic sensors 360 and 362 can be oriented at different angles and spaced apart by a distance D. In some embodiments, the distance D is 1.25 inches. Since a shock wave from a bullet is directional, one of the acoustic sensors (e.g. 360) might detect the shock wave while the other sensor (e.g. 362) might not. This information can be used as part of a forensics analysis to estimate the trajectory of a fired projectile/bullet. Similarly, the IR sensors 350 and 352 can also be disposed at different angles to increase the area of coverage.

The gunshot sensor can include video cameras and an analyzer. The analyzer can be used to detect a gunshot, in an indoor environment, based on the infrared information and the acoustic information. In embodiments, the analyzer is implemented by code executing on the one or more processors 310. The analyzer can perform video analytics based on video collected from the video cameras. The video analytics can track a suspected shooter of the gunshot using the video that was collected. While one configuration of IR sensors, acoustic sensors, and a microphone is shown, other embodiments include different numbers and configurations of the IR sensors, acoustic sensors, and the microphone. In other embodiments, additional IR sensors, acoustic sensors, microphones, video sensors, and processors are present in the gunshot sensor. In some embodiments, the sensor 340 is sized to fit into a standard 4×4 inch opening such as an opening used for a double light switch or a double electrical receptacle. In this way, gunshot sensors of disclosed embodiments are easily installed within existing infrastructure. Thus, the gunshot sensor can comprise an infrared sensor and an acoustic sensor. Furthermore, the gunshot sensor can further comprise a second infrared sensor and a second acoustic sensor. The infrared sensor and the second infrared sensor can be pointed to cover different fields of view. The acoustic sensor and the second acoustic sensor can be configured to not detect voices. The acoustic sensors can be configured to detect shock waves, and/or very loud sounds (e.g. 130 decibels or higher).

Figure 4:
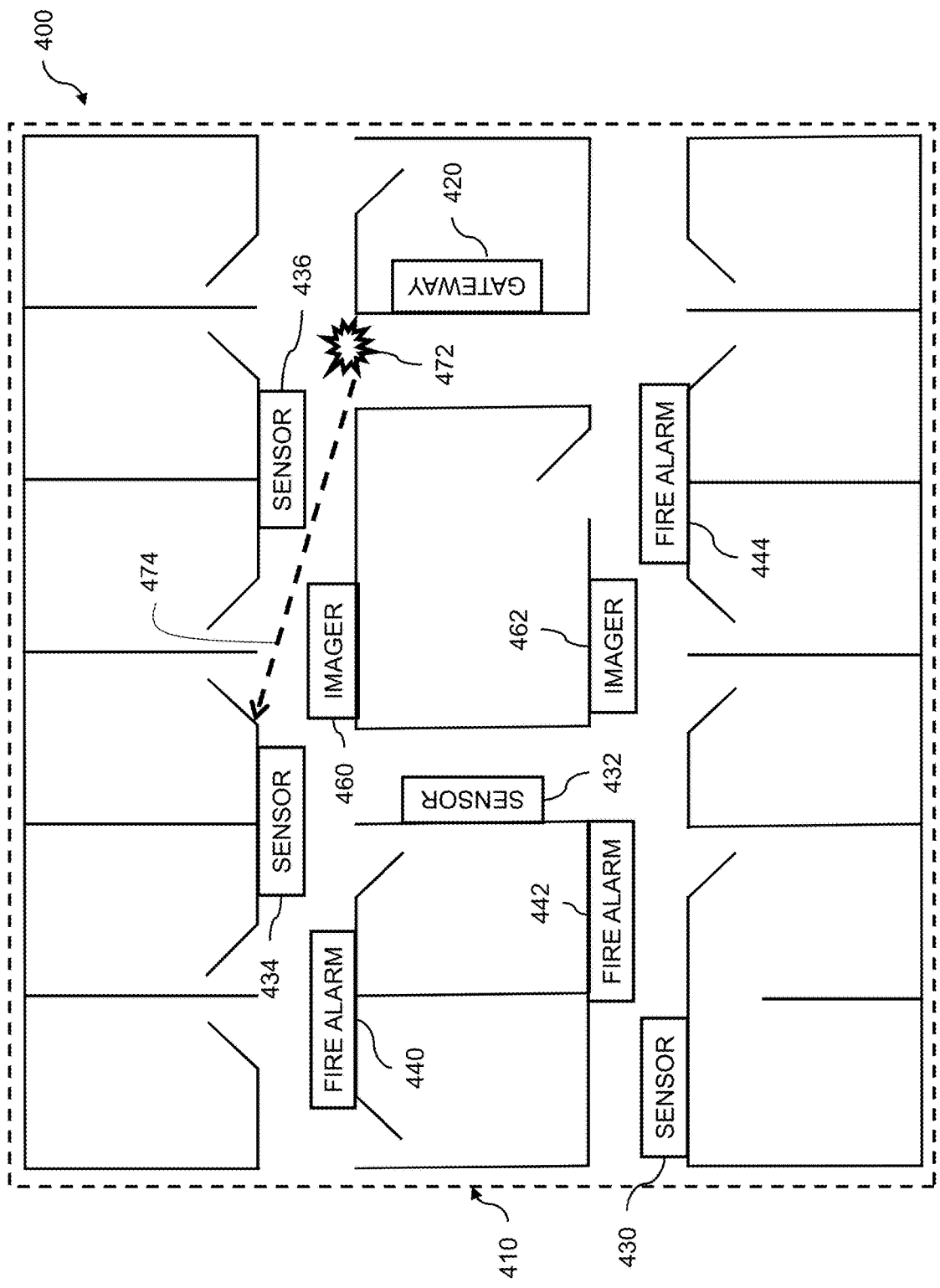
FIG. 4 is an example indoor sensor configuration.

FIG. 4 is an example indoor sensor configuration. Indoor gunshot detection can be based on infrared information and acoustic information, where both types of information can be collected within an indoor environment. Video collection can be engaged based on the detecting of the gunshot. Video analytics can be performed for tracking a suspected shooter of the gunshot using the collected video. An audio microphone can be activated based on the detection of the gunshot. The tracking of the shooter can be further based on the audio microphone that can be activated. The indoor area 400 has a perimeter 410 and can be similar to an office environment, with a plurality of individual rooms. A plurality of gunshot sensors 430, 432, 434, and 436 are installed at various positions within the area 400. The sensors 430, 432, 434, and 436 can be gunshot sensor units, where the gunshot sensor units can include two infrared sensors, two acoustic sensors, and a microphone. The infrared sensors can be used to detect a muzzle flash, and the acoustic sensors can detect sound events with various sound pressure levels (SPL). The infrared sensors and the acoustic sensors can be used for determining a direction of a gunshot, the distance to the gunshot, and so on.

When a gunshot is detected, video collection can be engaged. The video collection can include activating the imagers 460 and 462. The imagers can be video cameras that are standalone, as shown, or integrated into gunshot sensor units 430, 432, 434, and 436. The imagers can be a video camera, a still camera, or other digital image capture technique and system. The gateway 420, which in embodiments is an analyzer or a processor, can perform video analytics and other processing tasks on information that is collected by the sensors and the imagers. The video analytics can be performed on the video that is collected, where the video analytics can utilize image classifiers. The image classifiers can be used to identify a gun type. A suspected shooter can be identified based on the video analytics. The video analytics can be used along with operator oversight for tracking of a person of interest. The tracking of the person of interest can be based on clothing, body type, facial features, weapons, or motion.

A plurality of fire alarms 440, 442, and 444 are also installed at various positions within the area 400. A gateway 420 is installed within the area 400, and is configured to receive inputs from the plurality of gunshot sensors 430, 432, 434, and 436. In embodiments, the gateway 420 communicates with the gunshot sensors via a wired communication interface, such as Ethernet or RS-232. In other embodiments, the gateway 420 communicates with the gunshot sensors via a wireless interface such as WiFi. In such embodiments, each gunshot sensor is further equipped with a WiFi communication interface. The gateway 420 can include both wireless and wired communication interfaces. In embodiments, the gateway 420 also receives input from the plurality of fire alarms 440, 442, and 444. In such embodiments, when a fire alarm is activated, information pertaining to the time and duration of each strobe and/or buzzer activation of the fire alarms is communicated to the gunshot sensors, such that the gunshot sensors can compensate for the active fire alarm. In some embodiments, the compensation includes utilization of windowing techniques. In this example, a gunshot is fired at location 472, causing a projectile trajectory as indicated by path 474. In this situation, the gunshot sensor 436 is closest to the path 474. As the projectile/bullet passes by the sensor 436, a shock wave from the projectile is received by the acoustic sensors within the gunshot sensor 436. In the case of a gunshot sensor unit such as the sensor 340 of FIG. 3, the acoustic sensors are spaced apart by a distance D. In this configuration, each acoustic sensor within the gunshot sensor receives the shock wave at a slightly different time. This difference in time can be used to infer information about the gunshot, such as the approximate direction from which the projectile was fired, and/or the approximate speed of the projectile.

The gunshot sensors can be deployed throughout an indoor space. The indoor space can include rooms such as hotel rooms, hospital rooms, and classrooms; hallways; common areas such as lounges, meeting rooms, and lobbies; gymnasiums, cafeterias, stairwells, and restrooms; and so on. Therefore, the gunshot sensors can be used to determine that a gunshot event has occurred and this occurrence can be determined independent of the specific position of the gunshot sensor(s). Thus the gunshot sensors do not require knowledge of their position and the gunshot detection system does not require knowledge of the specific locations of the sensors. The goal of gunshot detection analysis is to accurately detect that a gunshot has occurred.

Environmental and manmade sources can confound the infrared sensor and the acoustic sensor because the environmental and manmade sources can produce infrared signals and acoustic signals that are similar to those produced by gunshot events. An example of an environmental signal source is a reflected flash of sunlight off a moving vehicle, mirror, or another shiny object. An example of a manmade source is a strobe. Strobes are ubiquitous and are used to serve many purposes including emergency and danger warnings, alerts, and so on. Strobes are commonly deployed in buildings for purposes such as fire alarms and other warning systems, and are routinely displayed on vehicles such as emergency vehicles, forklifts, transport vehicles, carts, heavy equipment, school buses, dangerous equipment, and so on. Other common uses of strobes include specialty lighting with uses for photography, public gathering places (e.g. dance clubs), halogen lights, etc. A strobe flash contains visible light spectra and can "bleed over" into other spectra, including infrared, which can cause a false gunshot detection. In embodiments, analysis is performed to detect that a number of strobes have occurred and that these occurrences create a problem for gunshot evaluation. In some cases, an environmental cause can be determined and changes to the environment can be recommended. For instance, a gunshot sensor can be moved so that it does not pick up reflected sunlight from cars parked in a nearby parking lot that is visible through a window in a building. Other similar changes can be recommended for the gunshot sensors or for the surrounding environment.

Figure 5:
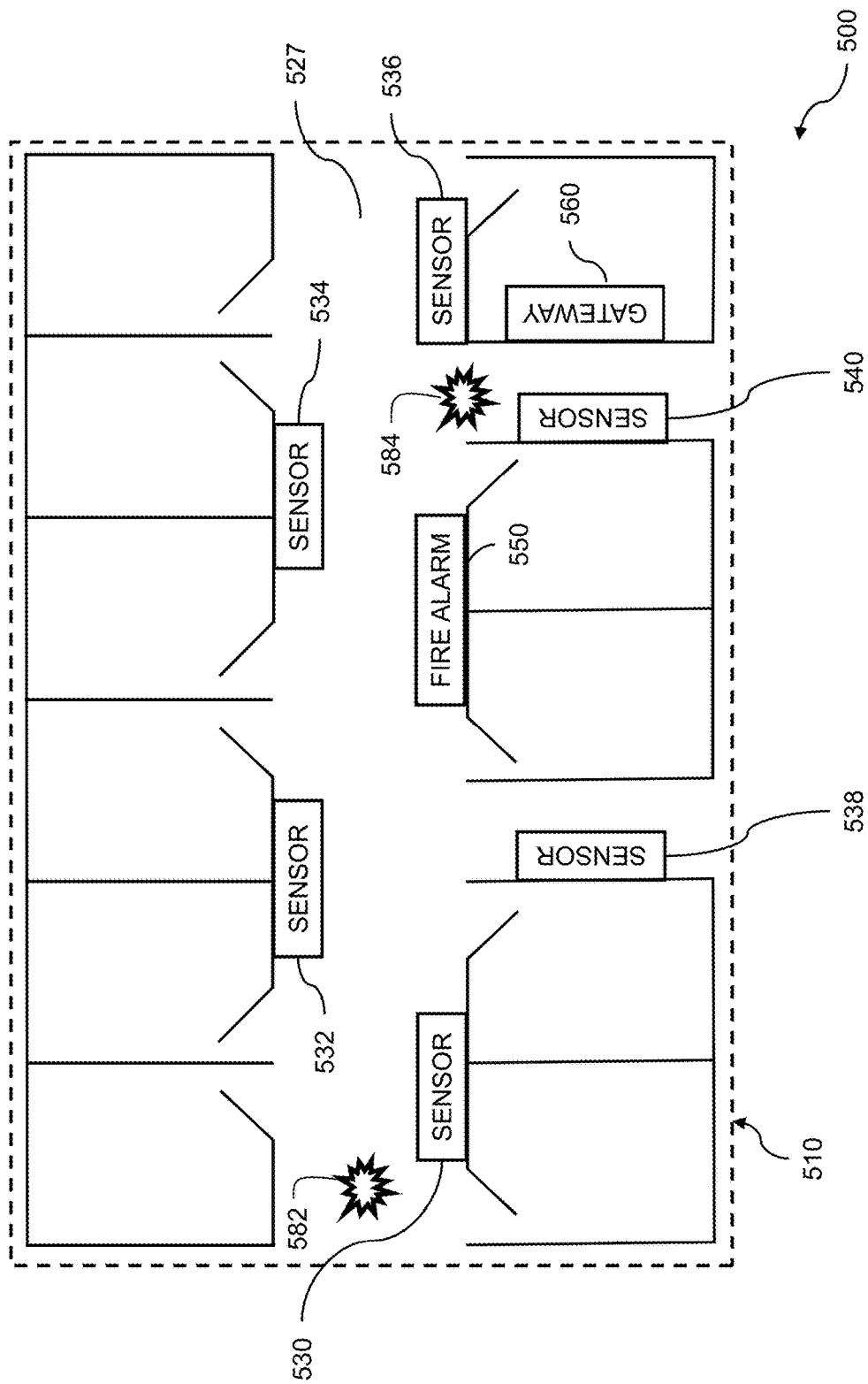
FIG. 5 is an example indoor sensor configuration in a hallway.

FIG. 5 is an example indoor sensor configuration in a hallway. The indoor area 500 has a perimeter 510 and comprises a long hallway 527. A plurality of gunshot sensors 530, 532, 534, 536, 538, and 540 are installed at various positions within the area 500. A fire alarm 550 is installed within the area 500. A gateway 560 is installed within the area 500 and is configured to receive inputs from the plurality of gunshot sensors 530, 532, 534, 536, 538, and 540. In embodiments, the gateway 560 also receives input from the fire alarm 550. In such embodiments, when a fire alarm is activated, information pertaining to the time and duration of each strobe and/or buzzer activation of the fire alarm is communicated to the gunshot sensors, such that the gunshot sensors can compensate for the active fire alarm. In some embodiments, the compensation includes utilization of windowing techniques. In this example, a first gunshot is fired at a location 582 and is primarily detected by the sensor 530. A second gunshot is later fired at a location 584 and is primarily detected by the sensors 540, 534, and 536. Information from each gunshot sensor is sent to the gateway 560, which can then perform analysis on the gunshot information and/or send the information to another system for further analysis. In embodiments, the gateway 560 sends the gunshot information to a server in the cloud via the Internet. In this way, assailants cannot damage or destroy the forensic evidence, even if they attempt to destroy equipment at the premises. Analysis in accordance with disclosed embodiments can correlate the IR signatures from the sensors 534, 536, and 540 to determine that the inputs received from the sensors 534, 536, and 540 all pertain to the same gunshot fired at the location 584, while the gunshot fired at the location 582 and detected primarily by the gunshot sensor 530 is a different gunshot event. Hence, disclosed embodiments are well-suited for detecting multiple gunshots in an indoor environment, including an indoor environment comprising a long hallway, such as what is often found in a school.

Figure 6A:
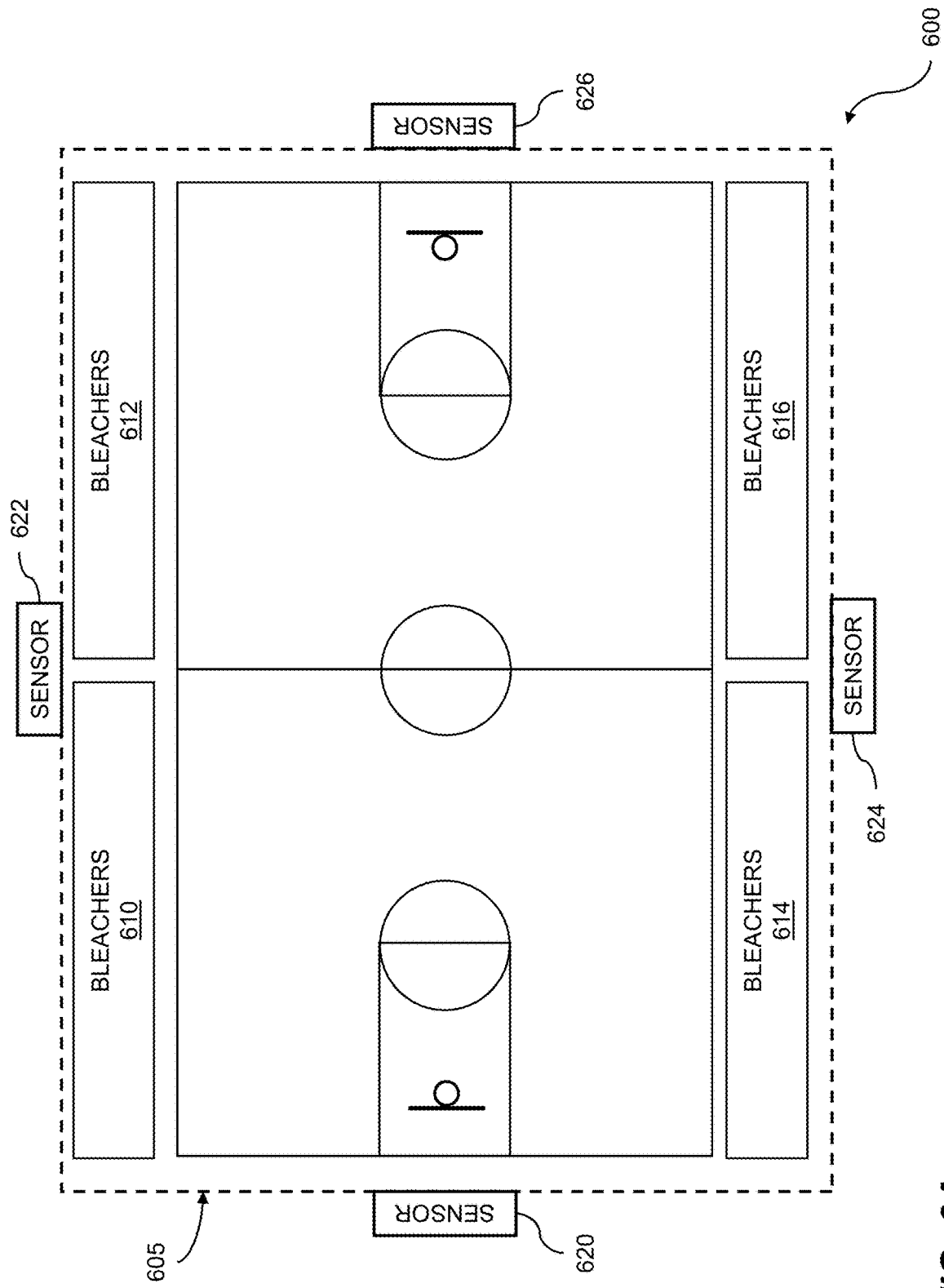
FIG. 6A is an example indoor sensor configuration with four sensors.

FIG. 6A is an example indoor sensor configuration with four sensors as installed in a gymnasium area. In such an embodiment, four gunshot sensors 620, 622, 624, and 626 are installed in an area 600 with perimeter 605. One gunshot sensor is installed on each wall of the gymnasium area to provide ample coverage of the area 600. Loud noises from events such as closing or opening the bleachers 610, 612, 614 and 616 do not trigger false alarms with gunshot sensors of disclosed embodiments. Even though manipulating the bleachers can make loud noises, it does not generate shock waves or infrared signatures, and thus, disclosed embodiments discern that such activity does not result from gunshots.

Figure 6B:
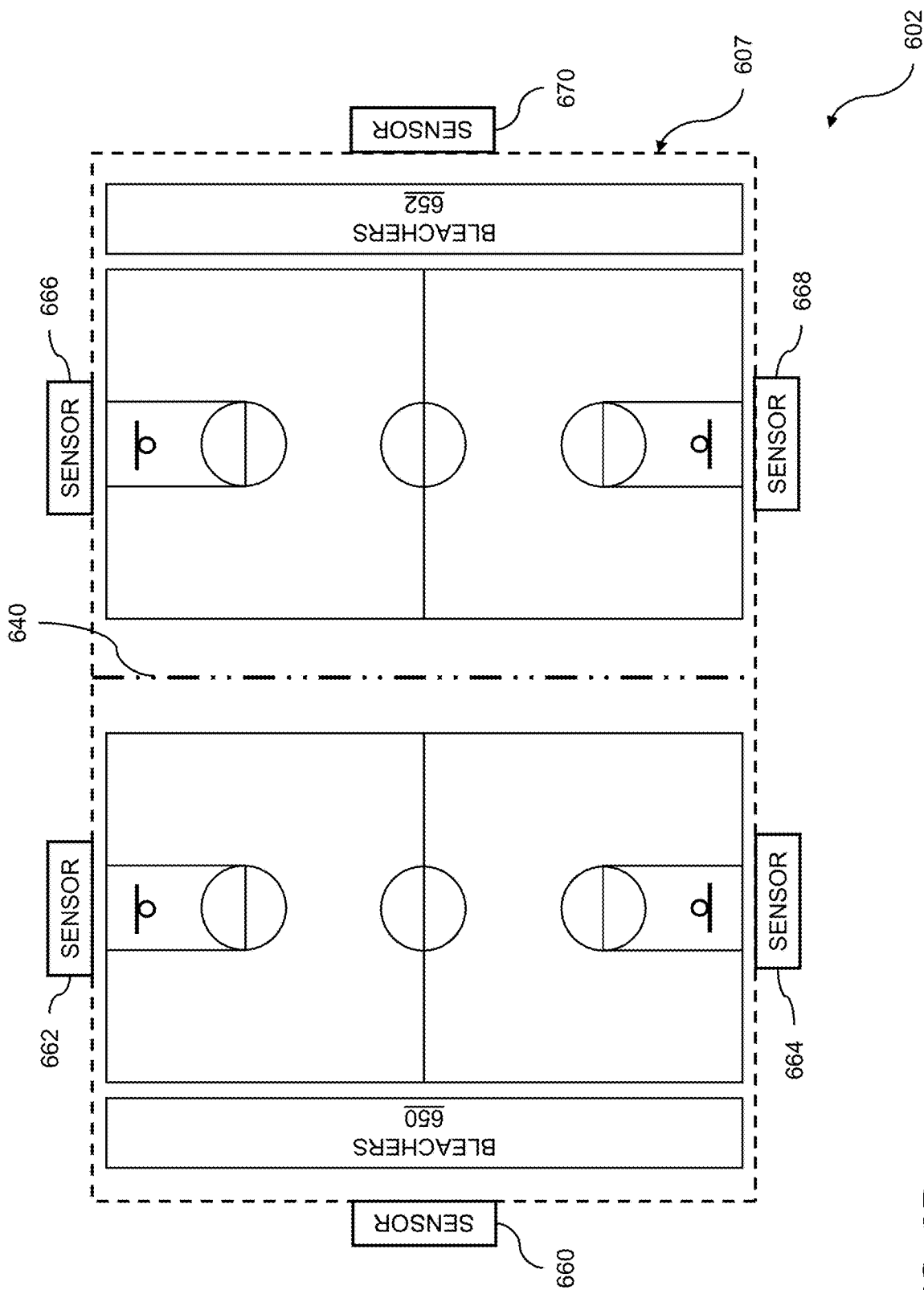
FIG. 6B is an example indoor sensor configuration with six sensors.

FIG. 6B is an example indoor sensor configuration with six sensors installed in a split gymnasium area 602 with perimeter 607. As is common in a school gymnasium, a partition wall 640 can be extended to partition a gymnasium into two smaller areas. In such situations, a six gunshot sensor configuration can be used, including the gunshot sensors 660 and 670 on the shorter walls of the gymnasium, and the gunshot sensors 664, 668, 662, and 666 installed on the longer walls of the gymnasium. Loud noises from events such as closing or opening the bleachers 650 and 652 do not trigger false alarms with gunshot sensors of disclosed embodiments. Even though manipulating the bleachers can make loud noises, it does not generate shock waves or infrared signatures, and thus, disclosed embodiments discern that such activity does not result from gunshots.

Figure 7:
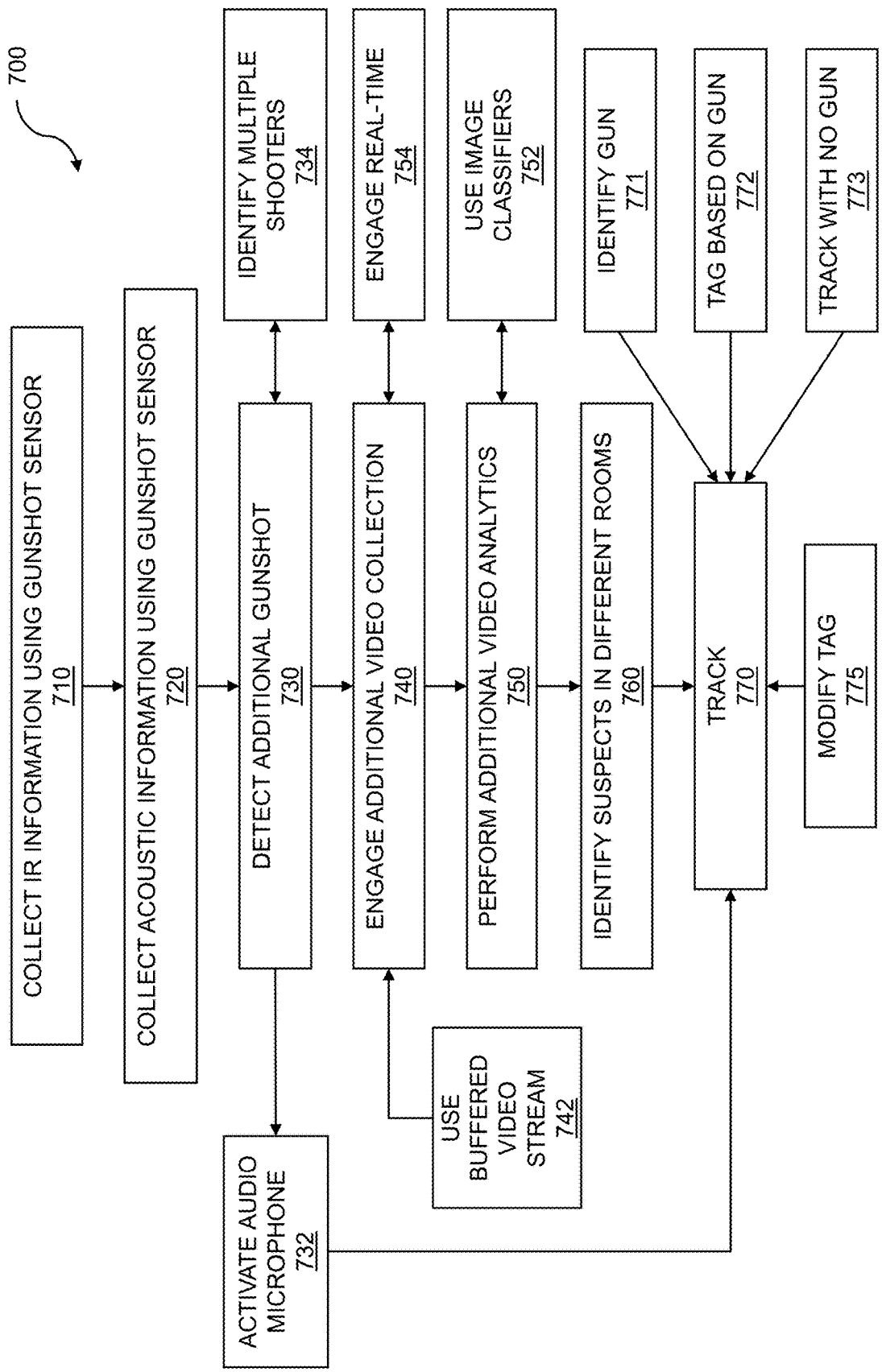
FIG. 7 is a flow diagram for additional gunshot analysis.

FIG. 7 is a flow diagram for additional gunshot analysis. The flow 700 can comprise a processor-implemented method for gunshot analysis. Indoor gunshot detection can be based on infrared information and acoustic information, where both types of information can be collected within an indoor environment. Video collection can be engaged based on the detecting of the gunshot. Video analytics can be performed for tracking a suspected shooter of the gunshot using the collected video. An audio microphone can be activated based on the detection of the gunshot. The tracking of the shooter can be further based on the audio microphone that can be activated. Subsequent to an initial gunshot detection, flow 700 includes collecting subsequent IR information using a gunshot sensor 710 in an indoor environment. The flow 700 includes collecting subsequent acoustic information using a gunshot sensor 720 in an indoor environment. The IR information collection 710 and the acoustic information collection 720 can occur simultaneously or near simultaneously on the same gunshot sensor. The IR and acoustic information collection can occur simultaneously or near simultaneously on multiple gunshot sensors.

The flow 700 includes detecting an additional gunshot 730. Gunshot analysis can further comprise detecting an additional gunshot, in the indoor environment, based on the infrared information and the acoustic information. The additional gunshot can be used to identify multiple shooters 734. Engaging additional video collection can be based on the multiple shooters which were identified. The additional video collection can enable additional video analytics to be performed for tracking more than one suspected shooter. In embodiments, the more than one suspected shooter can be in different rooms. In other embodiments, the more than one suspected shooter can be in the same room. Different analytics can be employed to determine whether the suspected shooters are in the same or different rooms.

The additional gunshot can be used to identify multiple shooters. For example, if two shots occur in different rooms at nearly the same time, multiple shooters can be assumed. The additional gunshot can engage additional video collection 740. The additional video collection can be engaged from one or more video streams from one or more video cameras or imagers. The additional gunshot can activate one or more audio microphones 732. The video collection can use one or more buffered video streams 742. The video collection can be engaged real-time 754 to enable real-time, or near real-time, use of the video. The flow 700 includes performing additional video analytics 750. The additional analytics are performed on a different video stream or with a different video analysis objective than the initial analytics. The additional video analytics can use image classifiers 752. The image classifiers can be used to identify characteristics about a gunshot event, a suspect shooter, and so on. The image classifiers can be used to identify a gun or a gun type. For example, the image classifiers can be used to identify a gun type such as a revolver, a semi-automatic handgun, etc., and/or to estimate or determine ammunition capacity. The video analytics can be used to update a gun type.

The flow 700 includes identifying shooter suspects in different rooms 760. The determination of the presence of multiple suspects can be based on separated-by-time or separated-by-distance gunshot events. The determination of multiple shooter suspects can be based on the additional video analytics. The suspects can be tracked 770. The tracking the suspects can be based on video analytics that identify a gun 771, tagging a suspect based on a gun 772, or tracking a suspect where a gun is no longer present 773. Alternatively, an operator can manually tag a suspect in the analytics with or without a gun for tracking. The tag can be modified 775 based on additional analytics, operator intervention, an additional gunshot event, or the like. The tracking 770 can be modified based on the activated audio microphone 732.

In embodiments, engaging additional video collection on one or more additional video streams, wherein the additional video collection enables tracking the suspected shooter moving out of view of the original video stream. The original video stream is the video stream that was engaged by the detection of the first gunshot or suspected gunshot. In embodiments, the additional video collection enables identification of an additional suspected shooter, wherein the identification of the additional suspected shooter is based on a video signature of the suspected shooter, wherein the video signature of the suspected shooter is analyzed through video classifiers, wherein results from the video classifiers are composited, and wherein the results that are composited provide a tag for further analyzing. In embodiments, analyzing the audio output of an audio microphone based on the detecting of the gunshot, wherein the audio output is passively buffered until the analyzing begins; using audio classifiers to make an identification of a gun type; and updating the identification based on the video analytics, wherein the video analytics includes using video classifiers to make a further identification of the gun type. In embodiments, generating an audio gunshot signature, wherein the audio gunshot signature is used to distinguish one or more additional gunshots from the gunshot that was detected. Various steps in the flow 700 may be changed in order, repeated, omitted, or the like without departing from the disclosed concepts. Various embodiments of the flow 700 can be included in a computer program product embodied in a non-transitory computer readable medium that includes code executable by one or more processors.

Figure 8:
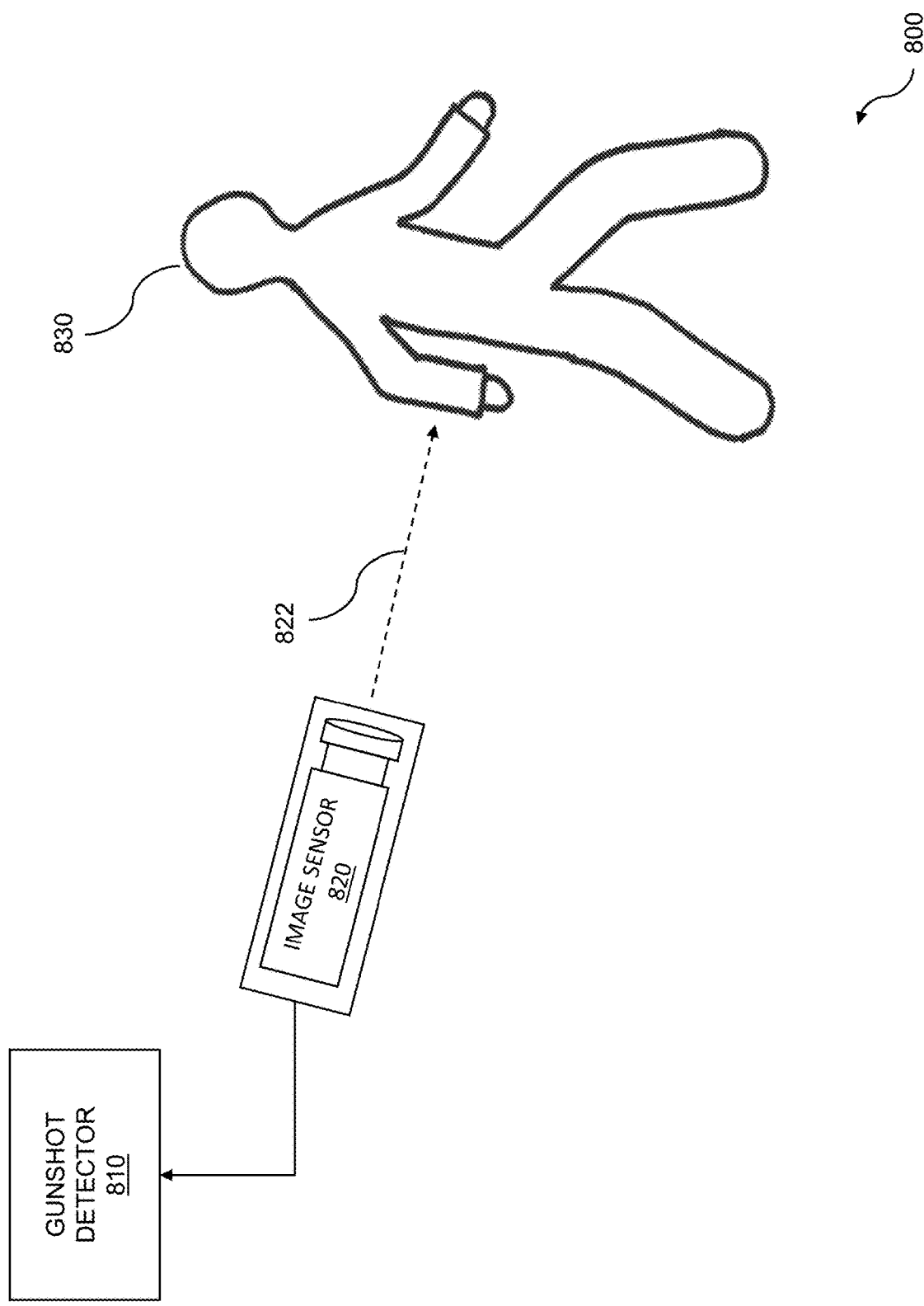
FIG. 8 is an example showing video collection.

FIG. 8 is an example showing video collection. Indoor gunshot detection can be based on infrared information and acoustic information, where both types of information can be collected within an indoor environment. Video collection can be engaged based on the detecting of the gunshot. Video analytics can be performed for tracking a suspected shooter of the gunshot using the collected video. An audio microphone can be activated based on the detection of the gunshot. The tracking of the shooter can be further based on the audio microphone that can be activated. An example of video collection 800 is shown for indoor gunshot detection. A gunshot detector 810 can be used to detect an indoor gunshot. The gunshot detector can include two infrared sensors, two acoustic sensors, a microphone and a processor. When a gunshot is detected, in an indoor environment, based on information collected from the infrared sensors and the acoustic sensors, video collection can be engaged. The gunshot detector 810 can engage an image sensor 820 for video collection. The image sensor can have a line of sight 822 to a person 830, where the person can be a person of interest. The image sensor 820 can include a video camera, a still camera, or another digital image collection system or method. Video analytics can be performed on the video collected from the image sensor. The video analytics can use image classifiers to identify a gun type, to track a person of interest, and so on.

Figure 9:
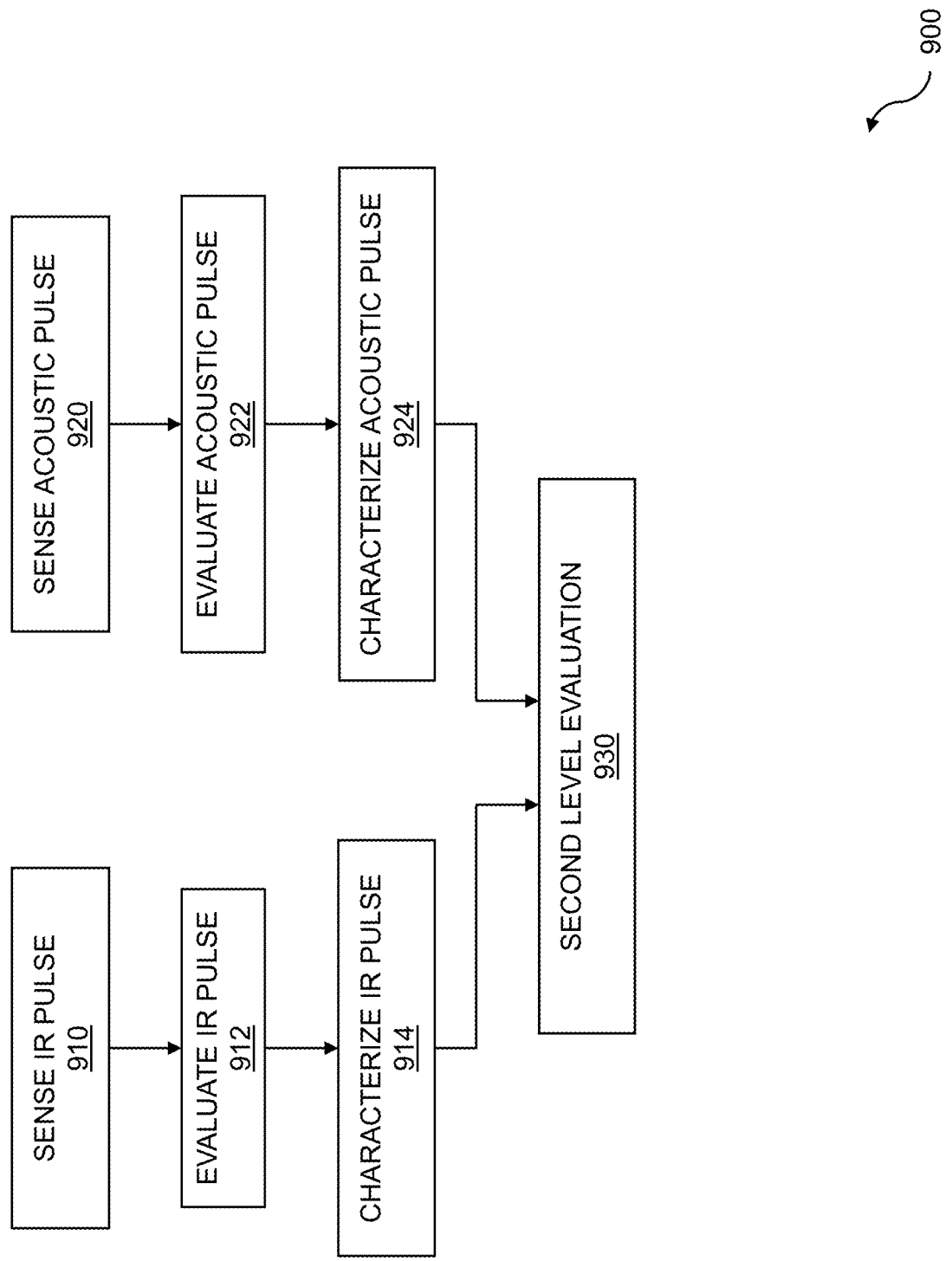
FIG. 9 is a flow diagram for signal analysis.

FIG. 9 is a flow diagram for signal analysis. The flow 900 includes sensing an IR pulse 910. In embodiments, the IR pulse has a duration ranging from about one millisecond to about twenty milliseconds. The duration can vary depending on the firearm. The flow 900 continues with evaluating the IR pulse 912. This can include determining peaks along different wavelengths within the range of IR acquisition. The flow 900 continues with characterizing the IR pulse 914. The characterizing can include identification of a particular peak and associating that peak with a known spectral signature from a firearm discharge.

The flow 900 includes sensing an acoustic pulse 920. The acoustic pulse can include a shock wave having a characteristic "N" shape that originates from the projectile, and/or a sound wave that originates from the firearm. The "N" shape is caused by a steep increase in sound pressure, followed by a somewhat slower negative depressurization to a minimum value, followed by another steep return to normal pressure. The acoustic pulse can occur in well under a millisecond. The flow 900 includes evaluating the acoustic pulse 922. This can include measuring a duration of the acoustic pulse. The flow 900 includes characterizing the acoustic pulse 924. The characterizing can include the identification of a particular acoustic pulse and associating that acoustic pulse with a known acoustic signature from a firearm discharge.

The flow 900 includes performing a second level evaluation 930. The second level evaluation comprises assembling results from one or more gunshot sensors. The flow 900 can comprise assembling results from the gunshot sensor along with a second gunshot sensor in a gateway device. The assembling can be accomplished independent of location for the gunshot sensor and location for the second gunshot sensor.

In embodiments, the assembling includes computation of a gunshot score, based on multiple sensor inputs. The sensor inputs can include shock wave detection, sound wave detection, and infrared detection. Furthermore, in embodiments, the gunshot score G is computed as $G = K_1 f_1(S) + K_2 f_2(I) + K_3 f_3(N)$, where S is the shock wave information, I is the infrared information, and N is the sound wave information. The function $f_1$ returns a value based on magnitude of the shock wave. The function $f_2$ returns a value based on the spectral signature of the infrared information. The function $f_2$ can include a correlation function and/or best fit function for an infrared signature that resembles that from firearm discharge. The function $f_3$ returns a value based on the magnitude of a sound wave. $K_1$, $K_2$, and $K_3$ are constants. The constants can be set to appropriately weight each of the three inputs. When the gunshot score, G, exceeds a predetermined level, a gunshot is deemed to have likely occurred. A gateway device can report this information to upstream systems such as campus security systems, law enforcement systems, and the like.

Figure 10:
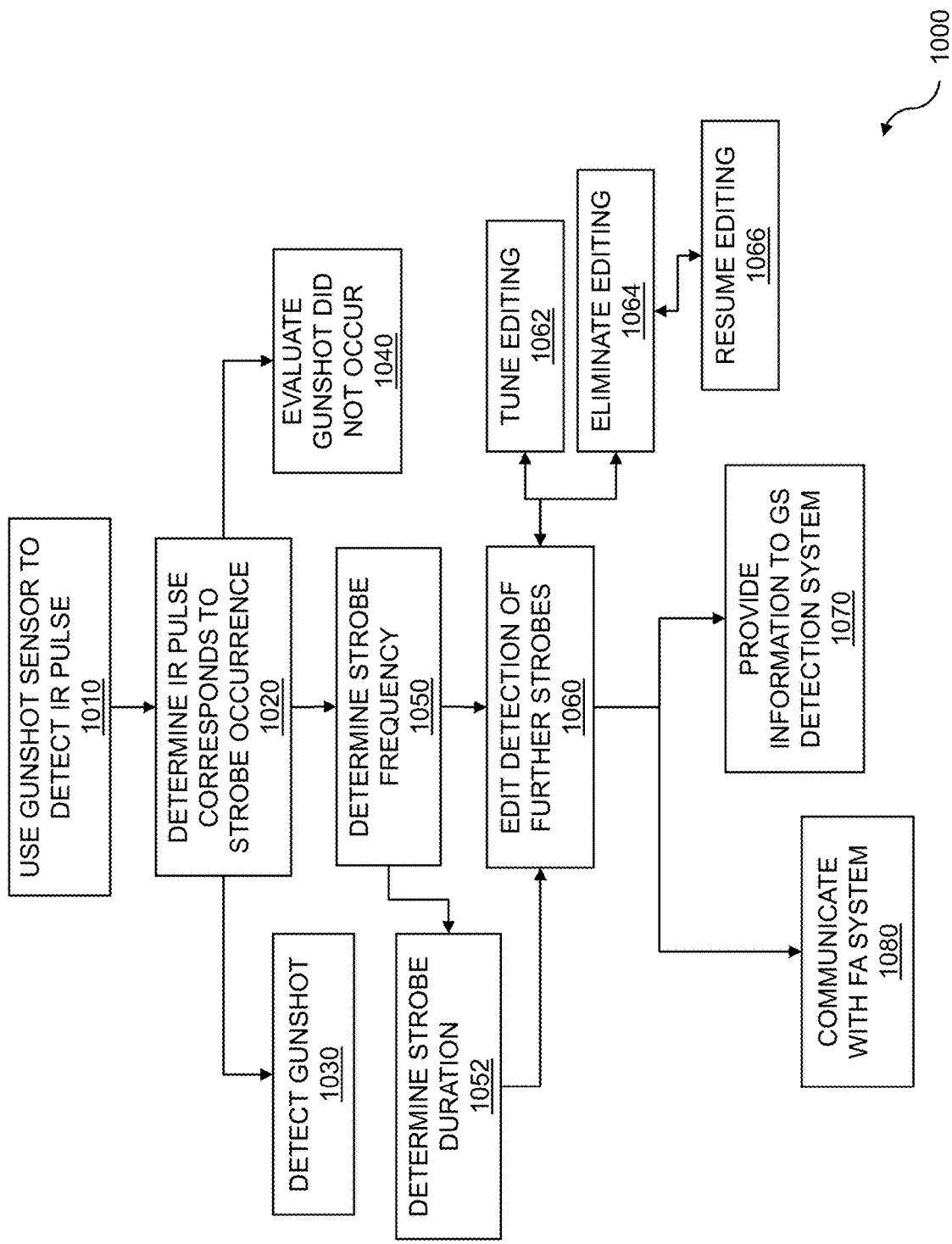
FIG. 10 is a flow diagram for gunshot analysis with strobe occurrence.

FIG. 10 is a flow diagram for gunshot analysis with strobe occurrence. Gunshot detection analysis can use a gunshot sensor to detect an infrared pulse, where the gunshot sensor can include an infrared sensor and an acoustic sensor. The infrared pulse can be determined to correspond to a strobe occurrence. A gunshot can be determined to have not taken place based on the strobe occurrence. A frequency of strobe occurrences can be determined, as can a duration for the strobes within the strobe occurrences. Editing detection can edit out a time window for sensing by the infrared sensor. The flow 1000 includes using a gunshot sensor to detect an infrared pulse 1010, where the gunshot sensor can include an infrared sensor and an acoustic sensor. In embodiments, the gunshot sensor includes other sensors such as a microphone, a visual sensor, etc. The gunshot sensor can be placed in an outdoor location or within an indoor location. In embodiments, the gunshot sensor is mounted on a wall, on a ceiling, etc., where the wall and/or the ceiling can be in an isolated room, in a hallway, in a common space such as a lounge or meeting room, and so on.

The flow 1000 includes determining that the infrared pulse corresponds to a strobe occurrence 1020. A fire alarm can include a strobe that produces a visible alert and a sounder that produces an alarm, codes, voice messages, etc. Thus a strobe occurrence can comprise a fire alarm. When the fire alarm is activated, the alarm can produce visible strobes and can emit the alarm, codes, voice messages, etc. The fire alarm strobes can be produced at a frequency, and each strobe can have a duration. The light produced by the fire alarm strobe can include infrared light spectra, visible light spectra, and so on. The infrared spectra of the fire alarm strobe can be detected by the infrared sensor included in a gunshot sensor. The flow 1000 includes evaluating that a gunshot did not occur 1040 based on the strobe occurrence. As discussed above, an activated fire alarm can produce a visual alert in the form of a series of strobes, and an audio alert in the form of an alarm, codes, voice messages, etc. The fire alarm strobes can be detected by the gunshot sensor as infrared pulses. A gunshot produces an infrared pulse from a muzzle flash, and it also produces a high sound-pressure level (e.g. 120 dB to 160 dB) impulse. When a gunshot occurs, both an infrared pulse and a high sound-pressure level impulse are detected. Without the high sound-pressure level, the detected infrared pulse can be attributed to a strobe occurrence that can include a fire alarm strobe.

The flow 1000 includes detecting a gunshot 1030, while the fire alarm is occurring, based on information from the infrared sensor and the acoustic sensor. As previously stated, a gunshot event includes an infrared pulse and a high sound-pressure impulse. The coincidence in time of the infrared pulse and the high sound-pressure level impulse can be attributed to the signature of a gunshot. Since the gunshot emits an infrared pulse and a high sound-pressure level, and the fire alarm emits a sequence of light pulses, where the light pulses include infrared spectra, visible light spectra, etc., detecting a gunshot occurrence can be complicated. In some embodiments, the gunshot occurs at a different time from the strobe occurrence. The gunshot can be differentiated from the fire alarm strobe by the coincidence of an infrared pulse and a high sound-pressure level for the gunshot. For the fire alarm strobe, the acoustic sensor can sense an absence of an acoustic pressure wave that can correspond to a gunshot during a timeframe of the strobe occurrence (e.g. no bang, no gunshot). When a gunshot and a fire alarm strobe produce infrared impulses at substantially the same time, the gunshot cannot be differentiated from the fire alarm strobe. The strobe occurrence can interfere with gunshot detection evaluation because the two strobes can be detected as one infrared pulse, where the infrared pulse can coincide with the high sound-pressure level impulse.

The flow 1000 includes determining a frequency of strobe occurrences 1050. The determining of the frequency of strobe occurrences can be accomplished using various techniques, such as measuring a period of time between an infrared pulse and the next infrared pulse (seconds/cycle), and inverting the time period to get frequency (cycles/second). Since the time periods between successive infrared pulses might not be equal, a time tolerance can be determined. The flow 1000 includes determining a duration 1052 for strobes within the strobe occurrences. The duration for strobes within the strobe occurrences can be determined using various techniques, such as the time difference between a pulse rise and a pulse fall, the time difference between the 50-percent point of a pulse rise and the 50-percent point of a pulse fall, and so on. Since the durations of successive infrared pulses might not be equal, a time tolerance associated with pulse duration can be determined.

The flow 1000 includes editing detection of further strobe occurrences 1060 based on the frequency of strobe occurrences. Detecting infrared pulses and high sound-pressure waves requires analysis to determine whether the infrared pulses were attributable to a fire alarm or a muzzle blast from a gunshot. Infrared pulses could be falsely tagged as gunshots, or worse, true gunshots could be incorrectly tagged and missed as fire alarm strobes. To reduce the analysis load, infrared pulses that correspond to strobe occurrences can be edited. Editing can include editing out a time window for sensing by the infrared sensor. By making the infrared sensor ignore infrared pulses that correspond to the fire alarm strobe or strobes, the analysis can be reserved for detecting gunshots, tracking gunshots, etc. The editing can be performed based on the strobe frequency and based on the strobe duration. The flow 1000 includes tuning the editing 1062 as more information on the sequence of strobes is collected. The detection of additional infrared pulses can be used to detect pulse frequency, duration, and tolerance.

As more pulses are detected, the editing can be tuned to more accurately track the fire alarm strobe occurrences. Tuning can include better prediction of the time of arrival of the next infrared pulse from the fire alarm strobe, minimizing duration of the editing to minimize the amount of time the infrared sensor detection is edited out, and so on. The flow 1000 includes eliminating the editing 1064 once the further strobe occurrences discontinue. Fire alarms can produce strobes and produce alarms, codes, voice messages, etc., for a period of time, and can then stop the strobes for a period of time. During the time that the strobes are not flashing, the editing can be eliminated or suspended, since any infrared pulse that can be detected during the absence of a fire alarm strobe can be a gunshot. The flow 1000 includes resuming the editing 1066 when further strobe occurrences resume. Just as fire alarms can stop producing strobes, the fire alarms can resume producing strobes. Since the strobes from a given fire alarm are likely to be produced with the same frequency, duration, and so on, as when previously produced, the editing can be substantially similar to the editing previously applied. Resuming the editing instead of re-computing pulse frequency, duration, tolerance, etc. from scratch can permit the editing to resume faster and with less processing overhead.

The flow 1000 includes providing information 1070 to a gunshot detection system, from the gunshot sensor, that a fire alarm is occurring based on the strobe occurrence. The information can be used in modifying detection by other sensors based on the fire alarm occurring. As discussed above, a fire alarm can produce visual alerts in the form of strobes, and audio alerts in the form of alarms, codes, voice messages, and so on. The strobes include infrared light spectra and visible light spectra. By providing information to a gunshot detection system that a fire alarm is occurring, the gunshot detection system can be alerted that some infrared pulses should be attributed to strobe occurrences from a sequence of strobes. The gunshot detection system can begin detecting infrared pulses corresponding to strobe occurrences, editing strobe occurrences, etc. The flow 1000 includes communicating between a fire alarm system and a gunshot detection system 1080, including the gunshot sensor, so that the fire alarm system can provide a fire alarm notification to the gunshot detection system of a fire alarm, and can further evaluate that a gunshot did not occur based on the fire alarm notification. Such communication can be used to enhance the discrimination between fire alarm strobes and gunshot events. The communication can be used to indicate that editing is necessary, to initiate editing, to control editing (e.g. infrared pulse frequency, duration, tolerance, etc.), and so on. Various steps in the flow 1000 may be changed in order, repeated, omitted, or the like without departing from the disclosed concepts. Various embodiments of the flow 1000 can be included in a computer program product embodied in a non-transitory computer readable medium that includes code executable by one or more processors. Thus, disclosed embodiments comprise evaluating strobe occurrence, based on the infrared information and the acoustic information, and using the strobe occurrence to provide gunshot false alert detection.

Figure 11:
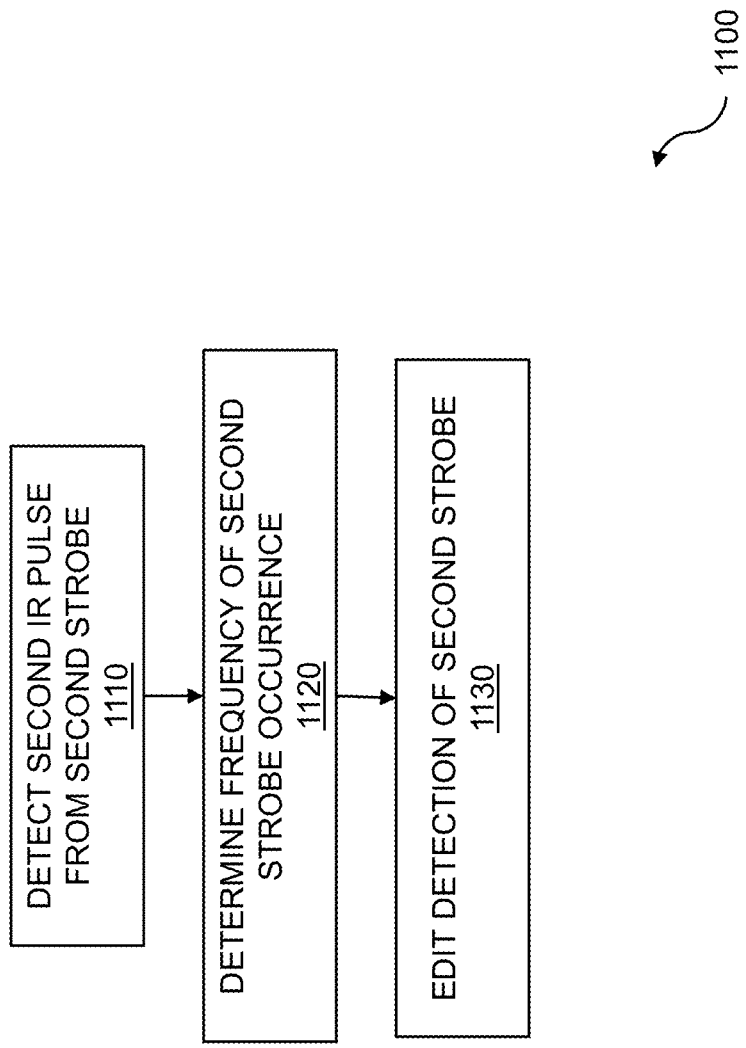
FIG. 11 is a flow diagram for second strobe evaluation.

FIG. 11 is a flow diagram for second strobe evaluation. The flow 1100 can continue from or be part of the previous flow 1000. The flow 1100 includes detecting a second infrared pulse corresponding to a second sequence of strobes 1110. The second sequence can be from a second strobe source. In certain configurations, a given gunshot detector can have a line of sight to a plurality of fire alarms. Since the fire alarms typically include strobes and sounders, the flashing of the one or more fire alarm strobes can produce infrared pulses that can be similar to infrared pulses generated by muzzle flashes from firearms. As was the case for the first sequence of strobes, the second sequence of strobes can be detected by the infrared sensor included in a gunshot sensor. The infrared pulses that result from the second sequence of strobes can be similar to the infrared pulses from the first sequence of strobes.

The flow 1100 includes determining a frequency of strobe occurrence for the second sequence of strobes 1120. A time period between a first strobe occurrence for the second sequence of strobes and a second strobe occurrence for the second sequence of strobes can be determined. By inverting the time period, the frequency of strobe occurrence for the second sequence of strobes can be found. The duration of strobe occurrence for a given strobe occurrence for the second sequence of strobes can also be determined. The duration of strobe occurrence can be determined based on a time difference between pulse rise time and pulse fall time, the time difference between a 50-percent point in a pulse rise and a 50-percent point in a pulse fall, and so on.

The flow 1100 includes editing detection of a second set of further strobe occurrences 1130 based on the frequency of a second sequence of strobes. As was the case for the first sequence of strobe occurrences, editing detection can occur for the second sequence of strobes. Editing detection can edit out a time window for sensing by the infrared sensor of a gunshot sensor. During the time window that is edited out, the infrared sensor can ignore infrared pulses that can be associated with a second fire alarm strobe. The time window that is edited out can be less than or equal to four percent of a time period between strobe occurrences of the second sequence of strobes. In embodiments, the frequencies for the frequency of strobe occurrences and the frequency of the second sequence of strobes are substantially similar. When the frequencies for the strobe occurrences of the first and second sequences of strobes are substantially similar, the infrared sensor can see the two fire alarm pulses as one pulse, as a pulse wider than a pulse from a single strobe, and so on. In further embodiments, frequencies for the frequency of strobe occurrences and the frequency of the second sequence of strobes are different. When the frequencies for the strobe occurrences of the first and second sequences of strobes are different, then the two sequences of strobes can be detected, where each sequence of strobes has its own frequency and duration. The editing detection can edit out time windows for sensing by the infrared sensor based on the multiple strobe frequencies and the multiple strobe durations. This concept can be extended to three, four, or more strobe sources with corresponding frequencies, durations, and editing. Various steps in the flow 1100 may be changed in order, repeated, omitted, or the like without departing from the disclosed concepts. Various embodiments of the flow 1100 can be included in a computer program product embodied in a non-transitory computer readable medium that includes code executable by one or more processors.

Figure 12:
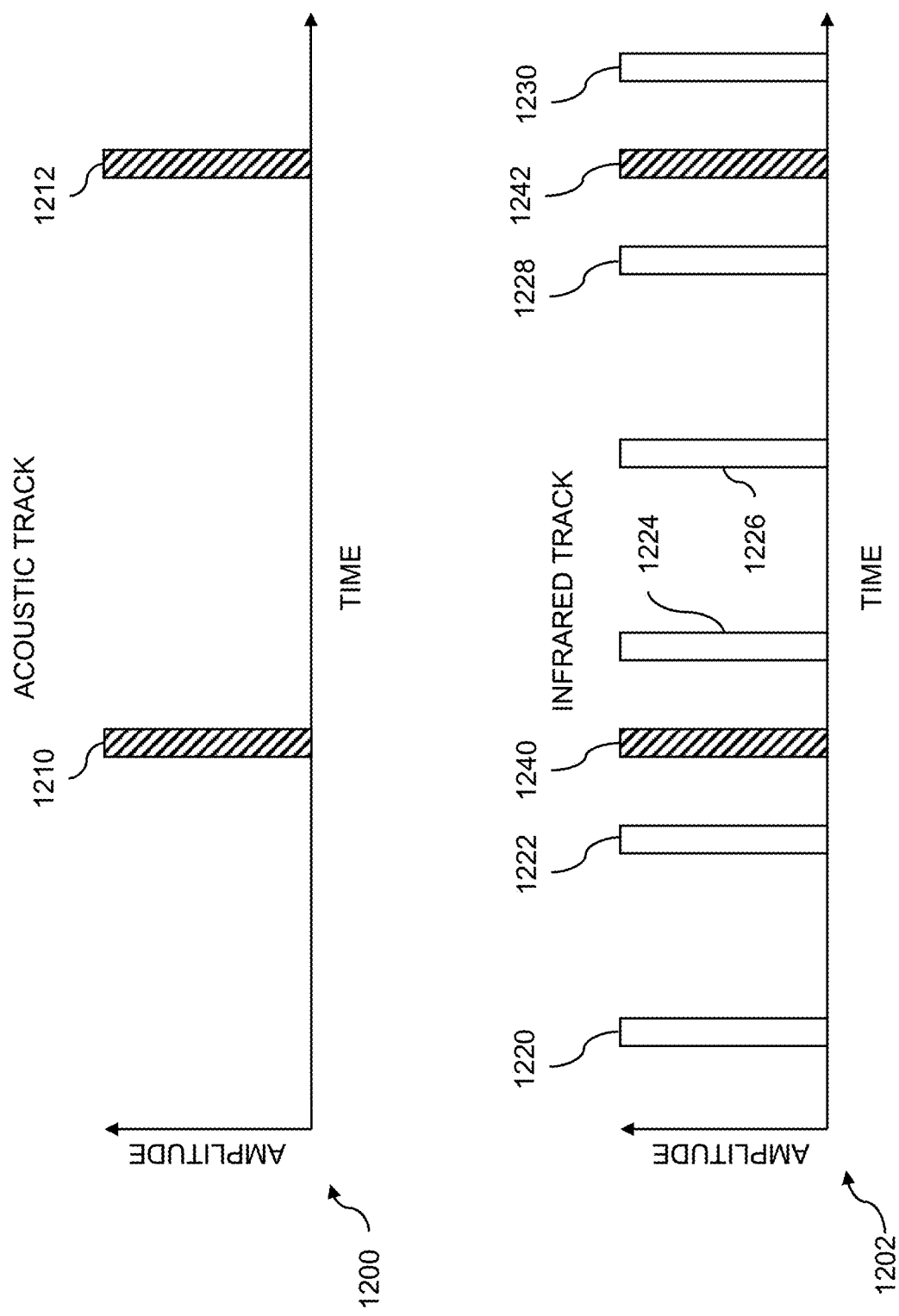
FIG. 12 is an example illustrating infrared and acoustic tracks.

FIG. 12 is an example illustrating infrared and acoustic tracks. As stated above, a gunshot sensor includes an infrared sensor and an acoustic sensor. In the event of a gunshot, the gunshot detector can detect an infrared pulse and an acoustic pulse. The infrared sensor can detect an optical flash at the muzzle of a firearm, and the acoustic sensor can detect the muzzle blast and might also detect a shockwave when the projectile expelled from the firearm is traveling at supersonic velocities. For a gunshot event, both an infrared event and an acoustic event can occur.

An example acoustic track 1200 is shown. In the event of one or more gunshot events, the acoustic sensor can detect high sound-pressure level waves 1210 and 1212. An impulse can result for each gunshot event that occurs. An infrared track 1202 is shown. Infrared pulses can result from a high intensity light strobe such as the strobe coupled to a fire alarm. Such pulses corresponding to a strobe occurrence can include 1220, 1222, 1224, 1226, 1228, and 1230. Infrared pulses can result from an optical flash at the muzzle of a firearm. Such pulses corresponding to an optical flash can include 1240 and 1242. The infrared track 1202 shows that infrared pulses alone might not distinguish between a strobe occurrence and an optical flash. While the fire alarm is occurring, a gunshot can be detected based on information from the infrared sensor and the acoustic sensor. As shown by the tracks 1200 and 1202, the overlap between the acoustic track pulses is associated with one or more gunshots, and the overlap between the infrared track pulses is associated with the gunshots. That is, the coincidence of the acoustic track pulses and the infrared track pulses can be used to detect a true gunshot. Conversely, when there is not a pulse on the acoustic track that corresponds to a pulse on the infrared track, then the source of the infrared pulse is likely not a gunshot. The acoustic sensor can sense an absence of an acoustic pressure wave corresponding to a gunshot during a timeframe of the strobe occurrence.

Figure 13:
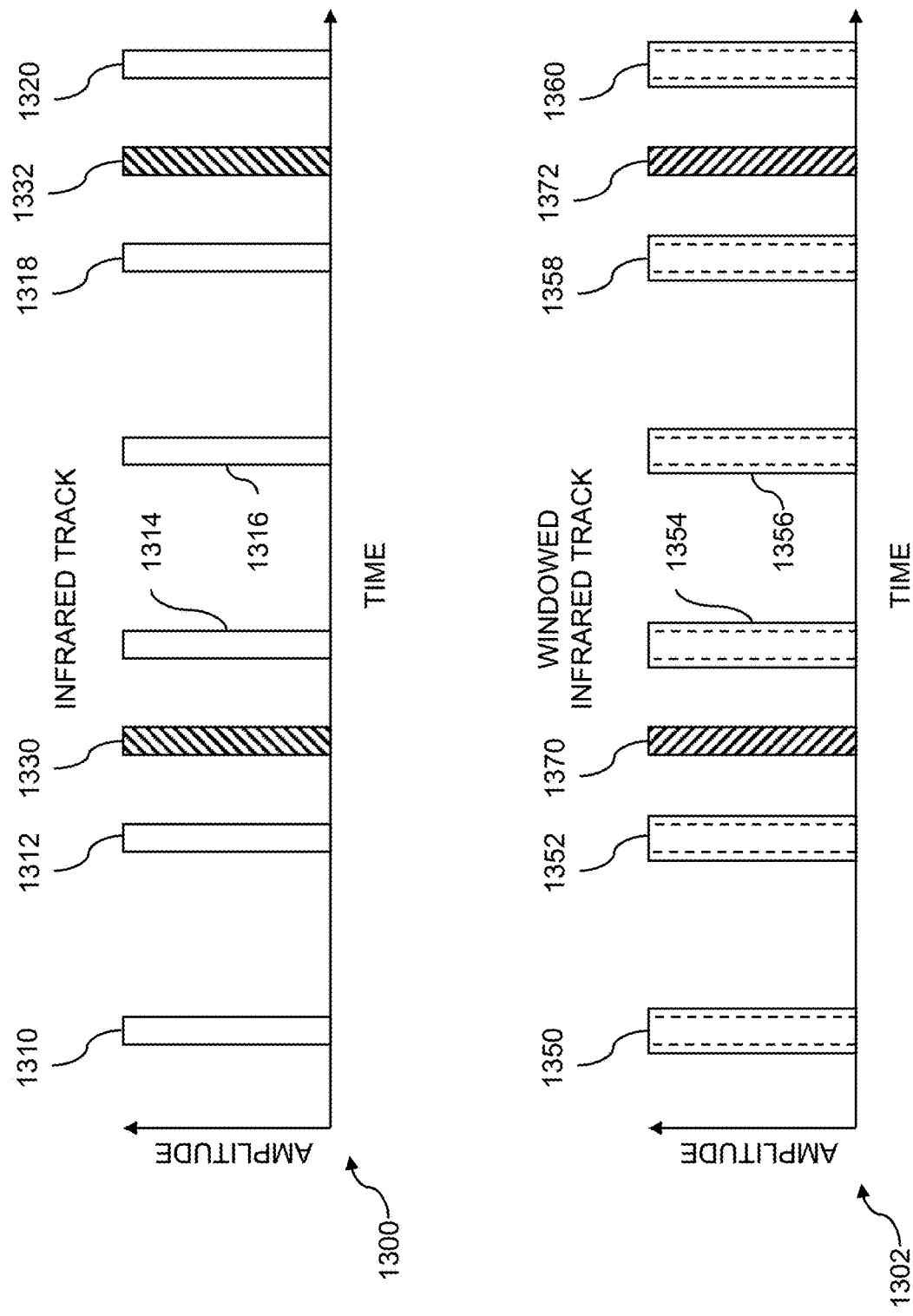
FIG. 13 is an example illustrating infrared and windowed infrared tracks.

FIG. 13 is an example showing infrared and windowed infrared tracks. Gunshot detection analysis can use a gunshot sensor to detect an infrared pulse, where the gunshot sensor can include an infrared sensor and an acoustic sensor. The infrared pulse can be determined to correspond to a strobe occurrence. A gunshot can be evaluated to have not occurred based on the strobe occurrence. A frequency of strobe occurrences can be determined, as can a duration for the strobes within the strobe occurrences. Editing detection can edit out a time window for sensing by the infrared sensor. An infrared track 1300 is shown. As time progresses, a train of infrared pulses at the same amplitudes or at differing amplitudes can occur, where the pulses can correspond to strobe occurrences from a strobe. The strobe can be associated with an ongoing fire alarm. In the example 1300, using a gunshot sensor to detect an infrared pulse can detect an infrared pulse corresponding to a strobe. The strobe occurrence can be part of a sequence of strobes. Pulses 1310, 1312, 1314, 1316, 1318, and 1320 can correspond to such a sequence of strobes. An infrared pulse can correspond to one or more gunshots 1330 and 1332. A frequency of strobe occurrences can be determined by detecting a train of pulses, determining the period between pulses, and inverting the period to find frequency. The duration of strobes within the strobe occurrences can be determined. The duration of strobes can be determined by calculating the time difference between time at which a pulse rises and the time at which a pulse falls. Pulse duration can be measured between the 50-percent points of the rising waveform and the falling waveform, etc.

By determining a frequency and duration of strobe occurrences for a sequence of strobes, editing detection of the set of strobe occurrences can take place. The editing detection is based on the frequency and duration of the sequence of strobes. A windowed infrared track 1302 is shown. The editing detection edits out a time window for sensing by the infrared sensor. During the edited time window, pulses resulting from infrared signals detected by the gunshot detector can be ignored. By ignoring signals, processing and analysis resources can be reserved for analyzing other signals that have not yet been identified, or signals that have been identified and are being tracked. The edited time window can be less than or equal to four percent of a time period between strobe occurrences. The small edited time window can avoid missing infrared pulses that might actually be gunshots. Based on the frequency of strobe occurrence for the sequence of strobes 1310, 1312, 1314, 1316, 1318, and 1320, the strobes from the sequence can be edited as strobes 1350, 1352, 1354, 1356, 1358, and 1360. Since the infrared pulses 1330 and 1332 can correspond to gunshot events, the pulses 1330 and 1332 can be left unedited as pulses 1370 and 1372. In some embodiments, the fire alarm(s) communicate an activated status to a gateway, which then conveys the information to the gunshot sensors. The communication can include information pertaining to the fire alarm buzzer and/or strobe pattern. In response, the gunshot sensors can perform the aforementioned windowing based on the information conveyed from the fire alarm(s).

Figure 14:
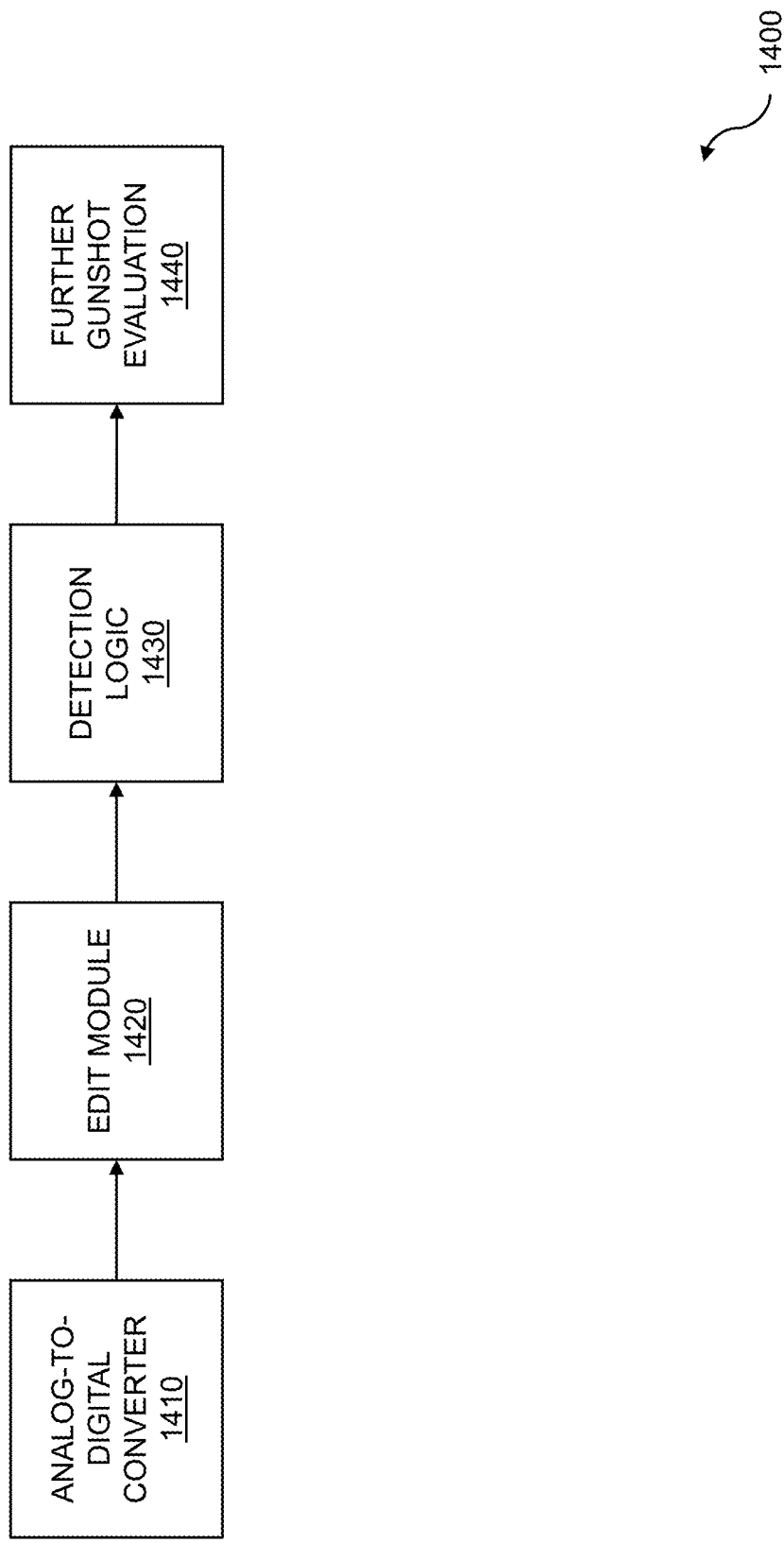
FIG. 14 is a logic diagram for gunshot evaluation.

FIG. 14 is a logic diagram for gunshot evaluation. Gunshot detection analysis can use a gunshot sensor to detect an infrared pulse, where the gunshot sensor can include an infrared sensor and an acoustic sensor. The diagram 1400 shows signal editing components for indoor gunshot detection analysis with an ongoing fire alarm. The signal editing components can be included in a gunshot sensor or can be external to the gunshot sensor. The signal editing components can be implemented in hardware, software, or a combination thereof. The signal editing components can include a processor and software to configure the processor. The signal editing components can be implemented with integrated circuits, can be cloud-based, and so on. The gunshot sensor can include an analog-to-digital converter 1410 and logic to perform gunshot detection. The analog-to-digital converter 1410 can be interposed between the infrared sensor and the logic. The logic can be edit logic. The analog-to-digital converter can operate on the pulses received from the infrared sensor or sensors and can operate on the impulses received from the acoustic sensor or sensors. The analog-to-digital converter can perform various operations including pulse detection, filtering, determining pulse frequency, determining pulse duration, and so on.

The analog-to-digital converter can be coupled to an edit module 1420. As previously stated, editing can include editing detection, where editing detecting can edit out a time window for sensing by the infrared sensor. The editing can be based on a frequency of strobe occurrences, on a duration of strobes within the strobe occurrences, and so on. The editing detection can be accomplished between the analog-to-digital converter and the logic to perform gunshot detection. The signal editing components can include detection logic 1430. The detection logic 1430 can be coupled to the edit module 1420. The logic to perform gunshot detection can include a processor, as well as software to configure the processor to perform the gunshot detection. The gunshot detection can determine that an infrared pulse corresponds to a strobe occurrence and can evaluate that a gunshot did not occur. The detection technique can be edited. The editing detection can be accomplished by the processor based on software to configure the processor to perform the editing. The editing detection can include loading software, where the software can be coded to implement a variety of algorithms, heuristics, and so on. The editing can be performed before the gunshot detection. The editing can include filtering, signal shaping, scaling, attenuation, discrimination, antialiasing, and so on. The signal editing components can include further gunshot evaluation 1440. The further gunshot evaluation module 1440 can be coupled to the detection logic 1430. The further gunshot evaluation can include detecting a gunshot with an ongoing fire alarm, detecting a gunshot with multiple ongoing fire alarms, detecting multiple gunshots, etc. The further gunshot evaluation can include identifying weapons, identifying shooters, tracking shooters, and so on.

Figure 15:
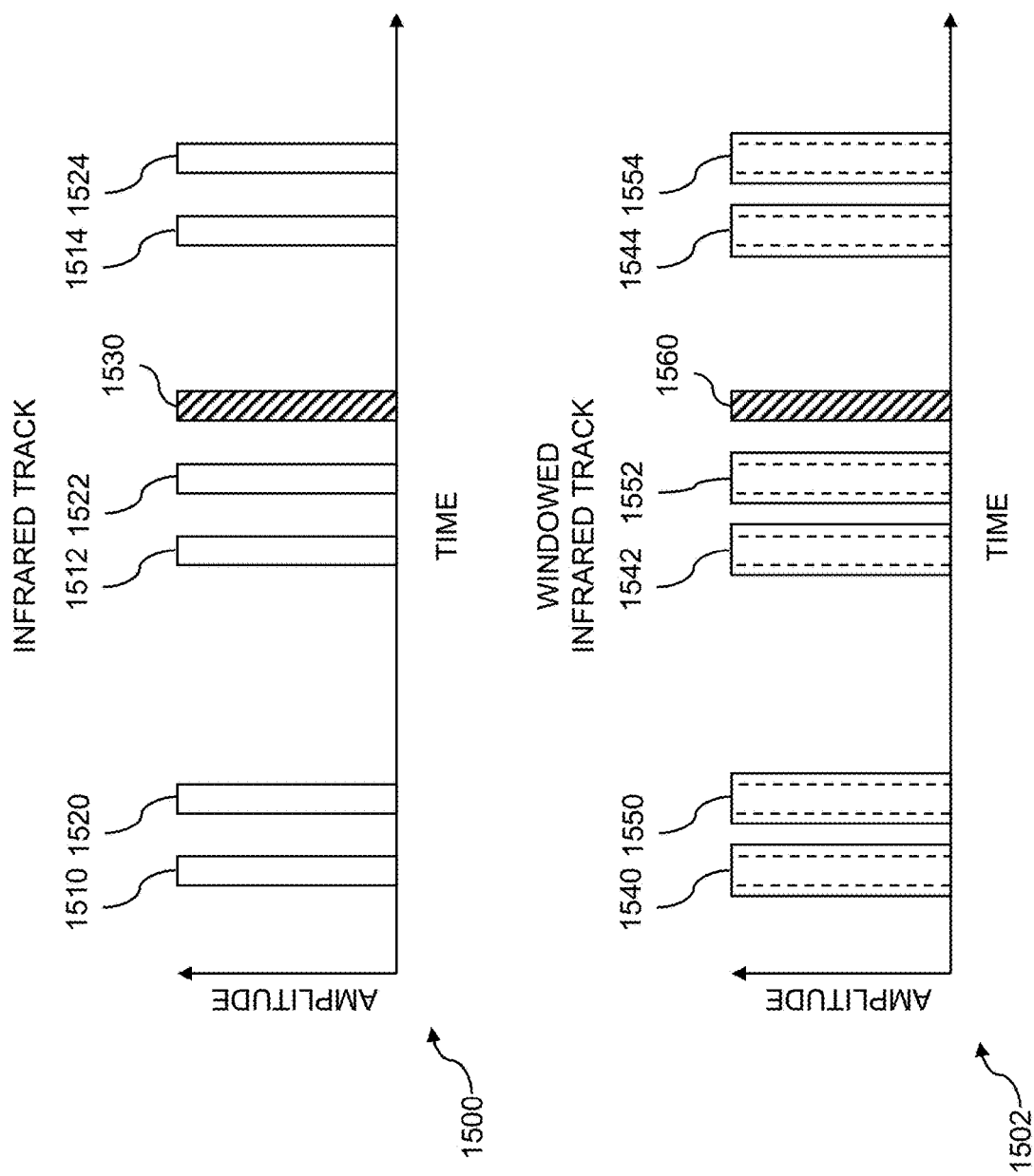
FIG. 15 is an example showing editing for multiple strobes.

FIG. 15 is an example showing editing for multiple strobes. In the presence of multiple strobes, editing detection can edit out multiple time windows for sensing by the infrared sensor. An infrared track 1500 is shown. As time progresses, a train of infrared pulses at the same amplitudes or at differing amplitudes can occur that can correspond to strobe occurrences from one or more strobes. In track 1500, using a gunshot sensor to detect an infrared pulse can detect a second infrared pulse corresponding to a second sequence of strobes. Pulses 1510, 1512, and 1514 can correspond to strobe occurrences of a first strobe, and pulses 1520, 1522, and 1524 can correspond to strobe occurrences of a second strobe. In practice, any number of strobe occurrences can be present. An infrared pulse can correspond to a gunshot 1530. As was the case for a single strobe, where a frequency of strobe occurrences for the first sequence of strobes was determined, a frequency of strobe occurrences for the second sequence of strobes can also be determined. The results of determining a frequency of strobe occurrences, for a second sequence of strobes, can be editing detection of a second set of further strobe occurrences, based on the frequency of second sequence of strobes. A windowed infrared track 1502 is shown. Based on the frequency of strobe occurrence for the first sequence of strobes 1510, 1512, and 1514, the strobes from the first sequence can be edited to 1540, 1542, and 1544. Similarly, based on the frequency of strobe occurrence for the second sequence of strobes 1520, 1522, and 1524, the strobes from the second sequence can be edited to 1550, 1552, and 1554. Since the infrared pulse 1530 can correspond to a gunshot event, the pulse 1530 can be left unedited as 1560.

Editing detection to edit out a time window for sensing by the infrared sensor infrared pulses corresponding to the first sequence of strobe occurrences, and editing detection to edit out a time window for sensing by the infrared sensor infrared pulses corresponding to the second sequence of strobe occurrences, can be dependent not only on the frequencies of the first sequence of strobe occurrences and the second sequence of strobe occurrences, but also on the durations of each sequence of strobe occurrences and the separation between the two sequences. Frequencies for the strobe occurrences and the second sequence of strobes can be substantially similar. Differentiating between the two sequences can be complex, since it can be difficult to differentiate between the beginning of one pulse in one sequence and the ending of another pulse in another sequence. When the pulse frequencies are substantially similar, the editing can be accomplished by increasing the value of the duration for strobes within the first sequence of strobe occurrences, such that the increased duration value covers both the first sequence of strobe occurrences and the second sequence of strobe occurrences. However, frequencies for the strobe occurrences and the second sequence of strobes can also be different. In this latter case, detection of strobe occurrences of the first sequence of strobes and detection of strobe occurrences of the second sequence of strobes can differentiate between the two sequences of strobes. The widths of the editing windows can thus be determined individually based on the durations of the two sequences of pulses.

Figure 16:
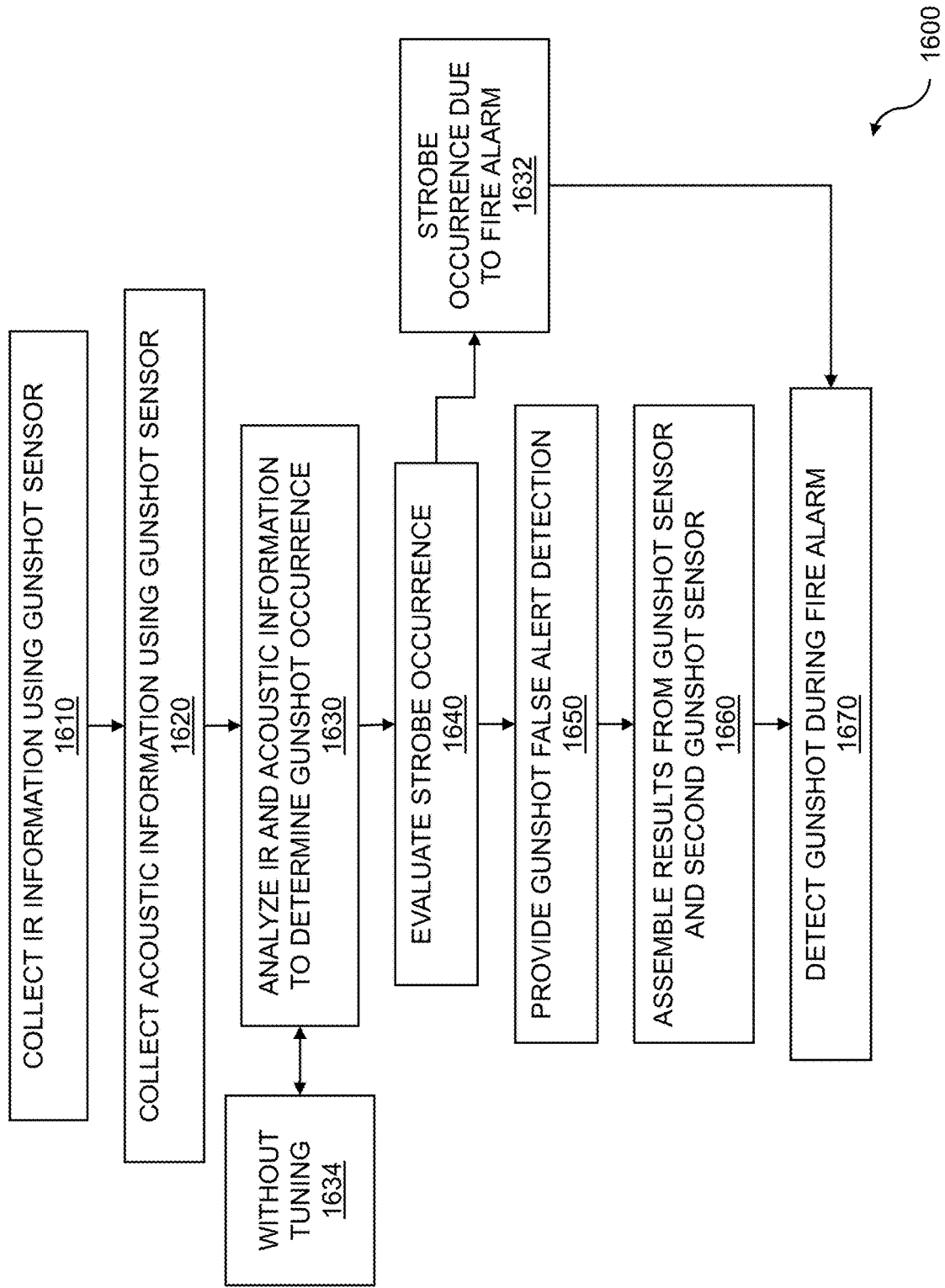
FIG. 16 is a flow diagram for indoor gunshot detection.

FIG. 16 is a flow diagram for indoor gunshot detection. The flow 1600 includes collecting infrared information within an indoor environment using a gunshot sensor 1610. In embodiments, the infrared information collected comprises energy at near-infrared wavelengths such as those ranging from 0.78 to three microns. The flow 1600 includes collecting acoustic information within the indoor environment using the gunshot sensor 1620. The acoustic information can include detection of a shock wave. The shock wave is detected with an acoustic sensor. The shock wave emanates from the projectile as it travels through the air at supersonic speeds. The acoustic information can include the sound wave from the gun itself. The sound wave may be detected by a microphone that is coupled to a pickup circuit with its gain configured to only detect very loud sounds (e.g. 130 decibels or greater).

The flow 1600 includes analyzing the infrared information and the acoustic information to determine a gunshot occurrence wherein the gunshot occurrence is determined independent of location for the gunshot sensor 1630. The analysis can include identification of a shock wave, an infrared pattern, and/or a sound wave pattern. These three inputs can be used to probabilistically detect that a gunshot occurred. In embodiments, a score is computed based on the detected levels and characteristics of these three inputs. If the computed score is above a predetermined level, then a gunshot is deemed to have likely occurred.

In embodiments, a spectral signature is identified and may include specifics for light emitted like that seen in near-infrared wavelengths. The duration, such as one to three milliseconds, might vary depending on the firearm. Regarding acoustic information, shock waves are typically formed due to events such as supersonic travel of a projectile, or a nearby lightning strike. The sound wave is a loud sound emitted from the firearm upon discharge. Other factors in an indoor environment can also cause loud sounds, such as fire alarms, doors slamming, and the like.

Complicating the gunshot detection is the fact that one or more of the three aforementioned inputs may be at a low level or undetectable, depending on the orientation and position of the firearm in relation to the gunshot sensor. For example, infrared information typically requires a line-of-sight between the gunshot sensor and the gun. Shock waves mostly travel perpendicular to the projectile path, and thus, the detected shock wave is a function of relative angle between the gunshot and the gunshot sensor. Finally, the sound wave from the muzzle blast can be comingled with other loud sounds in the indoor environment such as fire alarm sirens and/or buzzers.

The flow 1600 includes evaluating strobe occurrence 1640, based on the infrared information and the acoustic information, and using the strobe occurrence to provide gunshot false alert detection. In the flow 1600, the strobe occurrence comprises a fire alarm 1632. The gunshot detection can be affected by a fire alarm. A loud buzzer can be sounded with a periodicity and a strobe associated with the fire alarm might be periodically illuminated. While the strobe might radiate primarily in the visual range, there can be an infrared component to the strobe. Thus, by evaluating strobe occurrence, a more accurate detection of the gunshot is achieved, as the gunshot detector can be configured to automatically window out, or ignore, sensory input during the brief periods of strobe activation. In the flow 1600, the analyzing can occur irrespective of reverberations. As an example, the infrared component is not impacted by reverberations, so that component can be used with a higher weight than the sound wave information, which is affected by reverberations.

In the flow 1600, the gunshot sensor can collect the acoustic information wherein the reverberations from the gunshot occurrence add cumulatively to the acoustic information. The analyzing can occur irrespective of reflections in the flow 1600, and the gunshot sensor can collect the infrared information wherein the reflections from the gunshot occurrence add cumulatively to the infrared information. In the flow 1600, information on the reflections is not used in false alert of gunshot detection 1650. For example, by utilizing acoustic information from a shock wave, along with an infrared spectral signature, a gunshot detection determination can be made using inputs that are not affected by reverberations. In embodiments, information on the reverberations is not used in false alert of gunshot determinations. In situations where the inputs of shock wave and infrared spectral signature are not present (i.e. due to gun orientation in relation to the gunshot sensor), the sound wave information can be used. A thresholding circuit can be coupled to the acoustic sensor that is configured for sound wave detection. The thresholding circuit can be configured to trigger upon detection of a loud sound (e.g. 130 decibels or greater), and then stay active for a predetermined duration (e.g. 10 milliseconds), followed by a muting for a predetermined duration (e.g. 50 milliseconds). In this way, the acoustic sensor mutes and thus can ignore reverberations that occur in an indoor environment immediately following a firearm discharge.

In the flow 1600, the analyzing can be accomplished without tuning the gunshot sensor 1634 for the indoor environment in which the gunshot sensor resides. Since the gunshot sensor of disclosed embodiments utilizes multiple inputs to determine the probability of a gunshot, calibration or knowledge of a specific position within the premises is not needed in order to start using the system. A gunshot sensor can simply be installed in the premises to start monitoring for gunshots.

The flow 1600 includes assembling results from the gunshot sensor along with a second gunshot sensor in a gateway device 1660. The gateway device can be used to collect information from multiple gunshot sensors installed within a premises. For example, in a large building such as a school, there can be several gunshot sensors installed in each hallway, and multiple gunshot sensors installed in large areas such as a gymnasium and cafeteria. The gateway device can collect information from each gunshot sensor and forward the information upstream to another system such as a security system. Additionally, in some embodiments, the gateway device communicates configuration and/or control information to each of the connected gunshot sensors. In the flow 1600, assembling the results is accomplished independent of the locations for the gunshot sensor and the second gunshot sensor. This greatly simplifies the installation and setup of a gunshot detection system using gunshot sensors of disclosed embodiments.

The flow 1600 includes detection of a gunshot during a fire alarm 1670. By utilizing the multiple inputs as previously described, disclosed embodiments detect a gunshot even in the presence of a disruptive event such as a fire alarm. In this way, even if an assailant tries to mask the gunshot sounds by first setting off a fire alarm, disclosed embodiments that utilize the described techniques facilitate detection of gunshots, even in the noisy conditions of a fire alarm with an accompanying strobe. Various steps in the flow 1600 may be changed in order, repeated, omitted, or the like without departing from the disclosed concepts. Various embodiments of the flow 1600 can be included in a computer program product embodied in a non-transitory computer readable medium that includes code executable by one or more processors.

Figure 17:
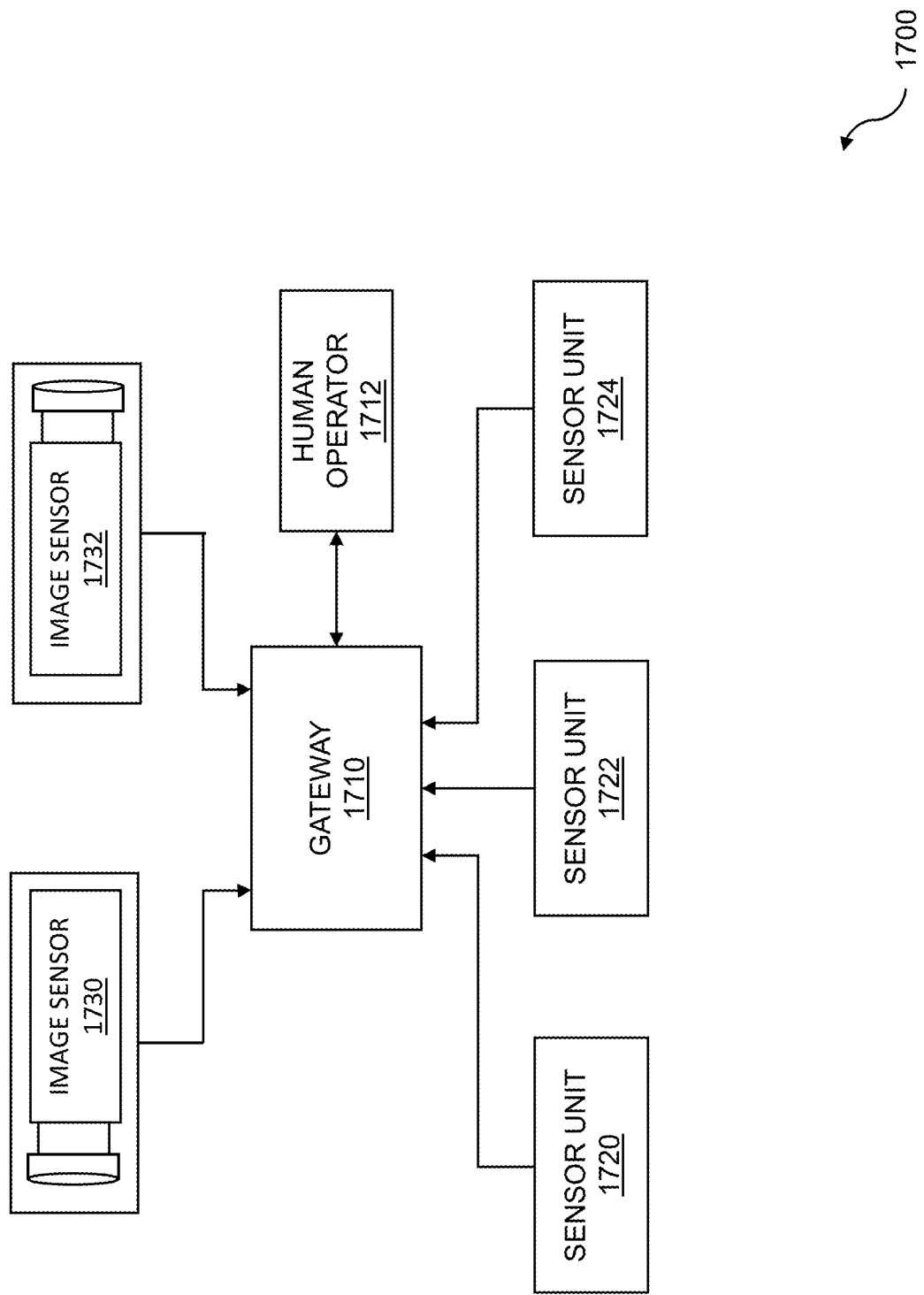
FIG. 17 is an example system gunshot detection system.

FIG. 17 is an example gunshot detection system. Indoor gunshot detection can be based on infrared information and acoustic information, where both types of information can be collected within an indoor environment. Video collection can be engaged based on the detecting of the gunshot. Video analytics can be performed for tracking a suspected shooter of the gunshot using the collected video. An audio microphone can be activated based on the detection of the gunshot. The tracking of the shooter can be further based on the audio microphone that can be activated. Sensors, cameras, and a central analyzer can be used for indoor gunshot detection with components of a system 1700. A central analyzer 1710, or gateway, can be used for detecting a gunshot in the indoor environment. The central analyzer can control the sensor units and image sensors. The central analyzer can be used to detect a gunshot, engage video collection, and perform video analytics. The central analyzer, or processor, can interact with a human operator 1712. The human operator can interact with the central analyzer to provide oversight. The human operator can tag a person of interest. The tagging by the human operator can be used along with video analytics for tracking the person of interest. The central analyzer can be coupled to a plurality of gunshot sensor units 1720, 1722, and 1724, a plurality of image sensors 1730 and 1732, and so on. The central analyzer can collect infrared information and acoustic information from the sensor units. The central analyzer can be coupled to image sensors 1730 and 1732. The image sensors can be engaged by the central analyzer. The image sensors that can be used can be video cameras, still cameras, or other digital image collection systems and techniques. The central analyzer can perform video analytics, where the video analytics utilize image classifiers. The image classifiers can be used to identify a gun type. A suspected shooter can be identified based on the video analytics. As mentioned above, with oversight from the human operator 1712, where the operator can tag a person of interest, tracking of the person of interest can be conducted using video analytics performed by the central analyzer.

Figure 18:
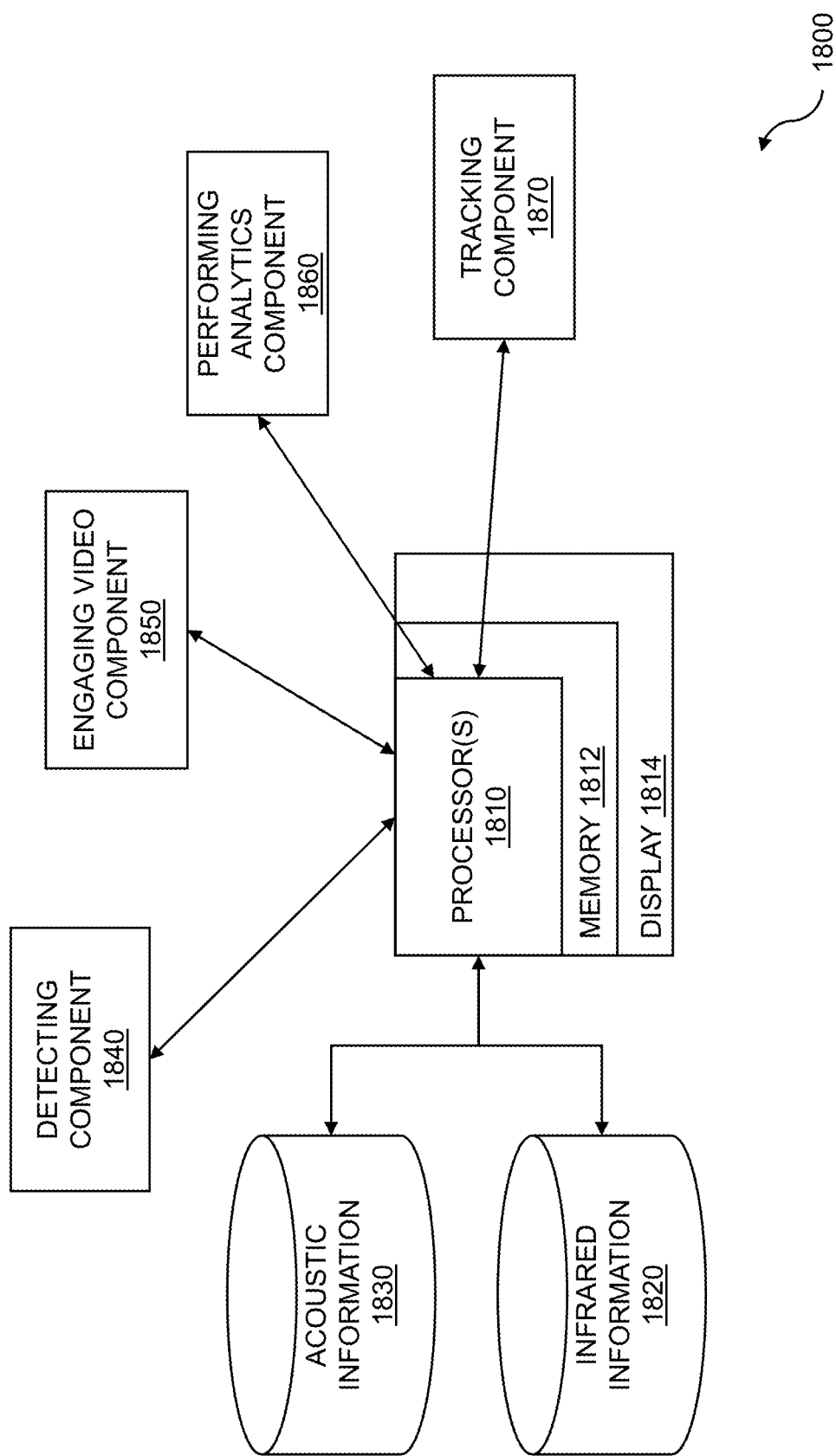
FIG. 18 is a system diagram for indoor gunshot detection with video analytics.

FIG. 18 is a system diagram for indoor gunshot detection with video analytics. Indoor gunshot detection can be based on infrared information and acoustic information, where both types of information can be collected within an indoor environment. Video collection can be engaged based on the detecting of the gunshot. Video analytics can be performed for tracking a suspected shooter of the gunshot using the collected video. An audio microphone can be activated based on the detection of the gunshot. The tracking of the shooter can be further based on the audio microphone that can be activated. The system 1800 for indoor gunshot detection with video analytics can be implemented using a variety of electronic hardware and software techniques. For example, the system 1800 can be implemented using one or more processors. An example system 1800 is shown for indoor gunshot detection with video analytics. The system 1800 can include a plurality of gunshot sensor units, within an indoor environment, wherein each of the plurality of gunshot sensor units comprises: two infrared sensors; two acoustic sensors; a microphone; and a processor. The system 1800 can include a plurality of video cameras; and an analyzer, coupled to the plurality of gunshot sensor units and the plurality of video cameras wherein the analyzer: detects a gunshot, in the indoor environment, based on the infrared information and the acoustic information collected from the plurality of gunshot sensor units; and performs video analytics, based on video collected from the plurality of video cameras, wherein the video analytics tracks a suspected shooter of the gunshot using the video that is collected. The system 1800 can perform a processor-implemented method for gunshot analysis comprising: collecting infrared information within an indoor environment; collecting acoustic information within the indoor environment; detecting a gunshot, in the indoor environment, based on the infrared information and the acoustic information; engaging video collection from a video stream, based on the detecting of the gunshot; and performing video analytics for tracking a suspected shooter of the gunshot using the video that is collected.

The system 1800 can include one or more processors 1810 coupled to a memory 1812 which can store and retrieve instruction and data, and a display 1814. The collecting of the infrared information 1820, and the collecting of the acoustic information 1830, can occur using the one or more processors 1810, or can occur using other processors. The collecting of the infrared information and the collecting of the acoustic information could occur using a wired or wireless computer network, a wired or wireless sensor network, the Internet, and so on. The infrared information 1820 can be collected from a gunshot sensor. The gunshot sensor can include two infrared sensors, and the infrared sensors can be pointed to cover different fields of view. The acoustic information 1830 can be collected from the gunshot sensor. The gunshot sensor can include two acoustic sensors, and the acoustic sensors can be pointed in different directions. The acoustic sensors can be attenuated. The acoustic sensors can be configured not to detect voices. The acoustic sensors can be pointed in different directions.

The system 1800 can include a detecting component 1840. The detecting component 1840 can detect a gunshot, in the indoor environment, based on the infrared information 1820 and the acoustic information 1830. The detecting can include activating an audio microphone based on the detecting of the gunshot. The audio microphone can be activated for a first limited period of time. The audio microphone can stay active for a second limited period of time. The information that can be collected from the audio microphone can be discarded after a third limited period of time. The system 1800 can include an engaging video collection component 1850. Video collection can be engaged based on the detection of a gunshot. As discussed above, the detection of the gunshot, in the indoor environment, can be based on the infrared information 1820 and the acoustic information 1830. The video can be collected from a gunshot sensor, a video camera, a still camera, or other digital image capture technique and system. The system 1800 can include a performing analytics component 1860. The analytics component 1860 can use video collection engaged from the engaging video component 1850. The system 1800 can include a tracking component 1870. The tracking can be based on performing video analytics for tracking a suspected shooter of the gunshot using the video that can be collected. The video analytics can utilize image classifiers, where the image classifiers can be used to identify a gun type. The tracking can be accomplished with operator oversight, where the operator can be an operator of the gunshot detection system. The tracking can include tracking of a person of interest. The tracking can be based on clothing, body type, facial features, weapons, or motion. The tracking of the suspected shooter can be based on the audio microphone that can be activated.

The system 1800 can include a computer program product embodied in a non-transitory computer readable medium for gunshot detection, the computer program product comprising code which causes one or more processors to perform operations of: collecting infrared information within an indoor environment using a gunshot sensor; collecting acoustic information within the indoor environment using the gunshot sensor; detecting a gunshot, in the indoor environment, based on the infrared information and the acoustic information; engaging video collection from a video stream, based on the detecting of the gunshot; and performing video analytics for tracking a suspected shooter of the gunshot using the video that is collected.

Each of the above methods may be executed on one or more processors on one or more computer systems. Embodiments may include various forms of distributed computing, client/server computing, and cloud based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"— may be implemented by computer program instructions, by special-purpose hardware-based computer systems, by combinations of special purpose hardware and computer instructions, by combinations of general purpose hardware and computer instructions, and so on.

A programmable apparatus which executes any of the above mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are neither limited to conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the forgoing examples should not limit the spirit and scope of the present invention; rather it should be understood in the broadest sense allowable by law.

What is claimed is:

1. A processor-implemented method for gunshot analysis comprising:
collecting infrared information within an indoor environment using a gunshot sensor;
collecting acoustic information within the indoor environment using the gunshot sensor;
detecting a gunshot, in the indoor environment, based on the infrared information and the acoustic information;
engaging video collection from a video stream, based on the detecting of the gunshot;
performing video analytics for tracking a suspected shooter of the gunshot using video that is collected;
tagging a person of interest by an operator of a gunshot detection system and using the video analytics for tracking of the person of interest, wherein the tagging comprises selecting a person of interest within the video stream, and wherein tagging the person of interest comprises modifying a tag of a suspected shooter based on identifying the suspected shooter as a law enforcement officer.

2. The method of claim 1 further comprising activating an audio microphone based on the detecting of the gunshot.

3. The method of claim 2 wherein the tracking of the suspected shooter is further based on the audio microphone that was activated.

4. The method of claim 2 wherein the audio microphone is activated for a first limited period of time.

5. The method of claim 1 wherein the video analytics utilizes image classifiers to identify a gun.

6. The method of claim 1 further comprising identifying the suspected shooter based on the video analytics.

7. The method of claim 1 wherein the indoor environment comprises a plurality of hallways and a plurality of rooms and includes a plurality of gunshot sensor units.

8. The method of claim 7 wherein the plurality of gunshot sensor units is utilized to locate where the gunshot occurred within the indoor environment.

9. The method of claim 1 further comprising detecting an additional gunshot, in the indoor environment, based on the infrared information and the acoustic information.

10. The method of claim 9 wherein the additional gunshot is used to identify multiple shooters.

11. The method of claim 10 further comprising engaging additional video collection based on the multiple shooters which were identified.

12. The method of claim 11 wherein the additional video collection enables additional video analytics to be performed for tracking more than one suspected shooter.

13. The method of claim 1 wherein the video collection is engaged from a buffered video stream.

14. The method of claim 13 wherein the video collection engaged from the buffered video stream corresponds to a point in time before the gunshot occurs.

15. The method of claim 1 wherein the tracking a suspected shooter of the gunshot is based on identifying a presented gun that appears for the gunshot.

16. The method of claim 15 further comprising tagging the suspected shooter of the gunshot with a tag in the video analytics based on the identifying a presented gun.

17. The method of claim 1 further comprising:
determining an initial gun type based on the acoustic information; and
updating the initial gun type determination based on the video analytics.

18. The method of claim 1 further comprising:
identifying a presented gun based on the video analytics;
identifying suspected shooter features based on further video analytics of a person presenting the presented gun; and
validating the suspected shooter based on still further video analytics.

19. The method of claim 1 further comprising engaging additional video collection on one or more additional video streams, wherein the additional video collection enables tracking the suspected shooter moving out of view of the video stream that was original.

20. The method of claim 1 further comprising analyzing audio output of an audio microphone based on the detecting of the gunshot, wherein the audio output is passively buffered until the analyzing begins; using audio classifiers to make an identification of a gun type; and updating the identification based on the video analytics, wherein the video analytics includes using video classifiers to make a further identification of the gun type.

21. A system for gunshot detection comprising:
a plurality of gunshot sensor units, within an indoor environment, wherein each of the plurality of gunshot sensor units comprises:
a faceplate having a central vertical axis and a contoured surface;
two infrared sensors disposed in the faceplate on opposite sides of the central vertical axis, wherein each infrared sensor is equally spaced from the central vertical axis;
two acoustic sensors disposed in the faceplate on opposite sides of the central vertical axis, wherein each acoustic sensor is equally spaced from the central vertical axis;
a microphone disposed in the faceplate along the central vertical axis and between the acoustic sensors; and
a processor;
a plurality of video cameras; and
an analyzer, coupled to the plurality of gunshot sensor units and the plurality of video cameras wherein the analyzer:
detects a gunshot, in the indoor environment, based on infrared information and acoustic information collected from the plurality of gunshot sensor units;
performs video analytics, based on video collected from the plurality of video cameras, wherein the video analytics tracks a suspected shooter of the gunshot using video that is collected; and
tags a person of interest and uses the video analytics for tracking of the person of interest, wherein the tagging comprises selecting the person of interest within the video stream, and wherein tagging the person of interest comprises modifying a tag of a suspected shooter based on identifying the suspected shooter as a law enforcement officer.

22. A computer program product embodied in a non-transitory computer readable medium for gunshot detection, the computer program product comprising code which causes one or more processors to perform operations of:
collecting infrared information within an indoor environment using a gunshot sensor;
collecting acoustic information within the indoor environment using the gunshot sensor;
detecting a gunshot, in the indoor environment, based on the infrared information and the acoustic information;
engaging video collection from a video stream, based on the detecting of the gunshot;

performing video analytics for tracking a suspected shooter of the gunshot using video that is collected;

tagging a person of interest by an operator of a gunshot detection system and using the video analytics for tracking of the person of interest, wherein the tagging comprises selecting a person of interest within the video stream, and wherein tagging a person of interest comprises modifying a tag of a suspected shooter based on identifying the suspected shooter as a law enforcement officer.

23. The method of claim 1 wherein tracking of the person of interest comprises tracking of the person of interest when no gun is presented by the person of interest.

24. The method of claim 1 wherein the tracking is performed based on body type.

25. The method of claim 1 wherein the tracking is performed based on facial features.

\* \* \* \* \*